US011765992B2

(12) United States Patent
Foster et al.

(10) Patent No.: US 11,765,992 B2
(45) Date of Patent: Sep. 26, 2023

(54) ORIENTATION-BASED MOWER CONTROL

(71) Applicant: Scythe Robotics, Inc., Longmont, CO (US)

(72) Inventors: Davis Thorp Foster, Boulder, CO (US); Robert Johnstone McCutcheon, IV, Longmont, CO (US); John Gordon Morrison, Longmont, CO (US); Isaac Heath Roberts, Longmont, CO (US)

(73) Assignee: Scythe Robotics, Inc., Longmont, CO (US)

( * ) Notice: Subject to any disclaimer, the term of this patent is extended or adjusted under 35 U.S.C. 154(b) by 556 days.

(21) Appl. No.: 16/923,178

(22) Filed: Jul. 8, 2020

(65) Prior Publication Data

US 2022/0007571 A1 Jan. 13, 2022

(51) Int. Cl.
*A01D 34/00* (2006.01)
*A01D 34/74* (2006.01)
*G05D 1/02* (2020.01)

(52) U.S. Cl.
CPC ........... *A01D 34/008* (2013.01); *A01D 34/74* (2013.01); *G05D 1/027* (2013.01); *G05D 1/0257* (2013.01); *G05D 2201/0208* (2013.01)

(58) Field of Classification Search
CPC ................. A01D 34/008; A01D 34/74; G05D 2201/0208
See application file for complete search history.

(56) References Cited

U.S. PATENT DOCUMENTS 5,204,814 A * 4/1993 Noonan ............... G05D 1/0265
701/25
5,974,348 A * 10/1999 Rocks .................. G01S 1/7034
701/28
8,275,506 B1 9/2012 Bishel
(Continued)

FOREIGN PATENT DOCUMENTS

CN 103728931 A 4/2014
DE 102018212412 A1 1/2020
EP 3798783 A1 * 3/2021 ............. A01D 34/00
(Continued)

OTHER PUBLICATIONS

International Search Report and Written Opinion of the International Searching Authority for application No. PCT/US2021/035827 dated Sep. 16, 2021.

*Primary Examiner* — Alicia Torres
(74) *Attorney, Agent, or Firm* — Moser Taboada

(57) ABSTRACT

Systems and techniques for detecting a difference in orientation between a lawn mower and a surface on which the mower is mowing, or between portions of such surface, based on one or more of sensor data or map data are discussed. The difference in orientation may then be used to control the lawn mower by, for example, raising a deck height or idling a blade speed, though other actuations are contemplated. In some examples, an amount the deck height is raised may be based on the difference in orientation. Based on a subsequent difference detected being at or below a threshold difference, the mower may return to previous operating conditions including, but not limited to, returning a blade speed to a previous blade speed and/or returning the deck height to a previous deck height, among other controls.

18 Claims, 9 Drawing Sheets

(56) References Cited

U.S. PATENT DOCUMENTS

2022/0312672 A1* 10/2022 Kowalewski ........ A01D 34/008

FOREIGN PATENT DOCUMENTS

| | | | |
|---|---|---|---|
| RU | 2103860 C1 | 2/1998 | |
| RU | 138253 U1 | 3/2014 | |
| WO | WO-2007109624 A2 * | 9/2007 | ........... A01D 34/008 |
| WO | WO-2016/103068 A1 | 6/2016 | |
| WO | WO-2018/000922 A1 | 1/2018 | |
| WO | WO-2018102338 A1 * | 6/2018 | ........... A01D 34/008 |
| WO | WO-2018132048 A1 * | 7/2018 | ........... A01D 34/008 |
| WO | WO-2020218960 A1 * | 10/2020 | |

* cited by examiner

ORIENTATION-BASED MOWER CONTROL

BACKGROUND OF THE INVENTION

When mowing, long grass, sloping regions, and the like can cause grass (or other vegetation) to impact mowing operations. For example, large quantities of grass can jam a mower blade, not only damaging the blade and the associated motor, but also reducing the ability for the mower to continue operations. Even in those examples where no damage is done to the mowing equipment, accumulated vegetation can cause suboptimal performance by, for example, improperly mulching the cut grass and causing poor fertilization of the grass resulting in vegetation death. Further, misalignment between the mower and a surface may cause similar damage including, undercutting portions.

BRIEF DESCRIPTION OF THE DRAWINGS

The detailed description will now be described, by way of examples, with reference to the accompanying drawings, where like numerals denote like elements, a leftmost numeral indicates the original figure in which the element is found, and in which.

DETAILED DESCRIPTION OF THE INVENTION

Figure 1A:
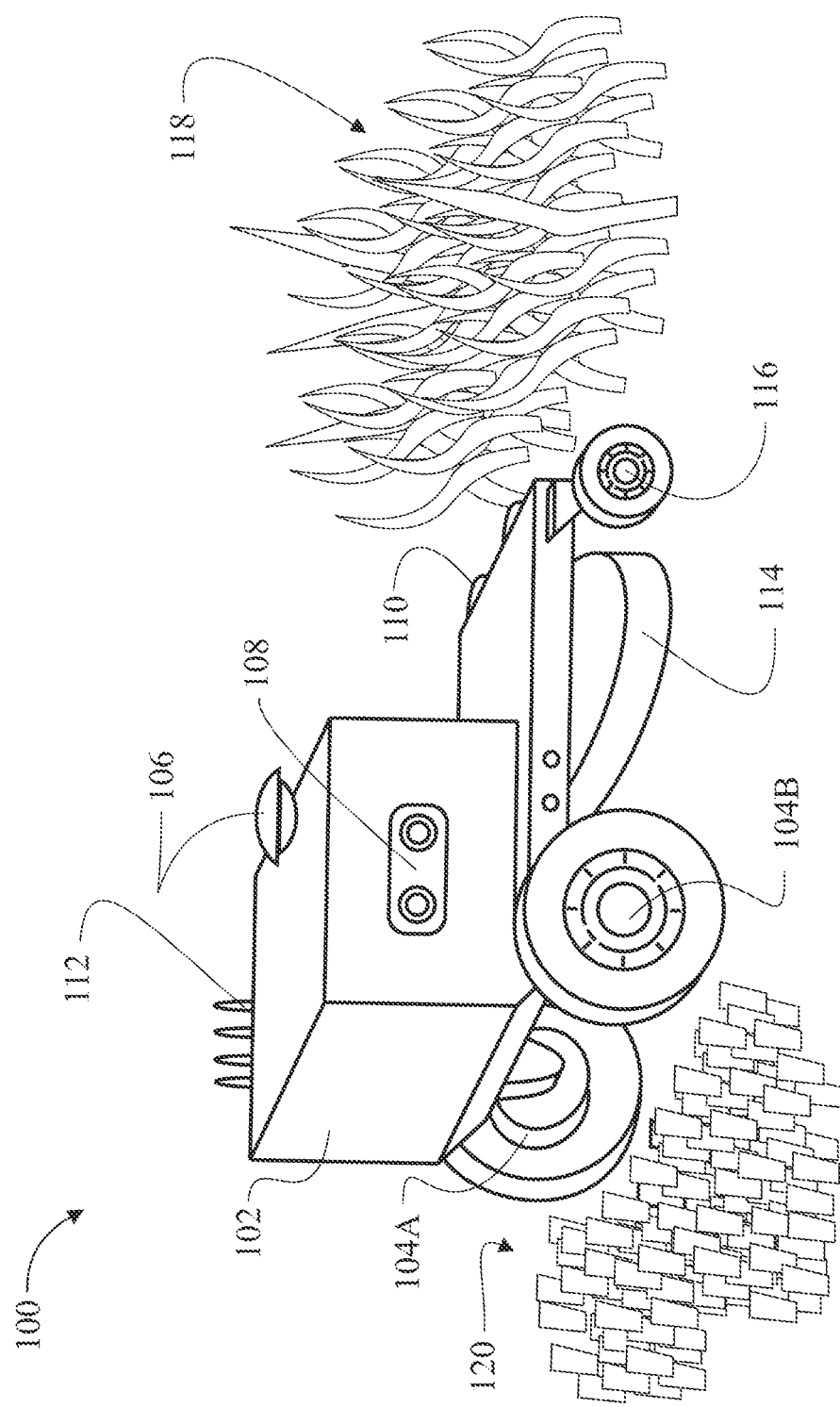
FIG. 1A depicts an example of an autonomous lawn mower system attempting to mow tall grass.

The following detailed description describes techniques (e.g. methods, processes, and systems) for adjusting one or more of a blade height, blade speed, and/or mower speed while mowing in response to detecting vegetation impacted in a mower, reducing its mowing ability. As described above, when mowing areas of high and/or thick grass or rough vegetation, such vegetation may clog or otherwise jam the blade in a mower. When this happens, the grass or other vegetation may reduce the functionality of the lawn mower and potentially even damage components of the lawn mower. Mowing operations are reduced by, for example, slowing or stopping the blades completely (thereby resulting in no cutting taking place, reducing a quality of cut, and/or requiring physical inspection), creating large "clumps" or patches of mulched vegetation that, in turn, result in improper fertilization which may cause damage to underlying vegetation—e.g., burning it out, causing mold, inviting pests, and the like, or otherwise.

As will be described in detail herein, in some examples, the lawn mower may perform n calibration of one or more of the deck height, blade speed, current, and/or torque of the lawn mower itself in order to determine a baseline of operation. As a non-limiting example, the mower deck may be first raised to a maximum height. Once the blades are lifted to the maximum height, current can be applied to the associated blade motor. An amount of current applied, any back EMF, torque, and/or blade speed can then be recorded. Blade speed may be determined based at least in part on one or more of an encoder, a Hall sensor, any back EMF produced, and the like. In at least some such examples, such measurements (current, back EMF, torque, blade speed, etc.) may be recorded as the mower deck is slowly lowered to the desired height and/or immediately after the lawn mower begins to move in a forward direction to mow. In some examples, measurements over a period of time after beginning to mow may be filtered to determine such calibrated values. Such recorded measurements may then be used as a reference for comparison while mowing. In at least some, but not all, such examples, those measurements recorded immediately after the lawn mower has begun moving forward may be used for comparison purposes. In similar examples, such calibration need not raise the deck to the maximum height before spinning up the blades. In such examples, the lawn mower may rely on a map comprising information regarding an area to be mowed. Here, the lawn mower may be placed (e.g., whether autonomously controlled, manually propelled, or otherwise) in an area of little to no vegetation (dirt, concrete, etc.) when started. Similar calibration steps as those described above may be used to record the parameters when starting from those areas of known little to no vegetation. Regardless, calibration parameters or values may be associated with a map and based on a type of vegetation to be mowed, a vegetation height, a time of year, environmental conditions (e.g., whether the vegetation is damp or not), and the like, such that calibration values are referenced which provide mowing parameters (blade speed, height, mower speed, current requirement, torque, etc.) in similar mowing situations. Calibrations may be performed from time to time, intermittently during a mow, and/or every time.

Once calibrated, impact to mowing operations may be determined by continuously monitoring one or more of the current applied to the blade, the torque of the blade, any back EMF, rotational speed of the blade, or the like. As blade speed is reduced, additional current may be supplied to maintain a target or desired blade speed. In at least some examples, such a blade speed may be approximately 3000 rpm, though higher or lower rotation rates are contemplated. However, once a current limit is reached, no additional rotational speed of the blade can be achieved.

In the event that the blades slow down below a set point (such as the blade speed determined by calibrating the lawn mower), the desired blade speed may be reduced and/or a forward speed or velocity of the mower may be reduced to maintain a quality of the mow. As will be discussed in detail below, however, reducing the blade speed may be coupled with a reduction in the forward speed of a mower such that the mower maintains a given quality of cut. In at least some such examples, a user may be able to provide an indication as to whether to optimize quality of cut (e.g., as may be determined based at least in part on a cut quality metric described in detail below) or time to cut a given area.

Reduction and/or degradation of mowing operations may additionally or alternatively be monitored based on a current required to drive the blade motor and/or an associated torque. In such examples, an amount of current used to drive the blade at a desired speed may be compared to a previously measured current, such as the current determined through calibration and/or a most recently measured current. In any such examples, current (and/or the associated torque) may be filtered, such as by averaging the measured current over a period of time, applying a Bayesian filter (such as a Kalman filter), or otherwise. The filtered current may then be compared to the previously recorded, or otherwise nominally indicated (e.g., calibrated), current. If the most recently measured current (and/or a filtered current) meets or exceeds the nominal current by some threshold amount, a signal of impacted mowing may be generated and the mower may be controlled accordingly.

Additionally or alternatively, a rate of change of current required to drive the blade at a given speed may be determined. A sequence of subsequently measured currents may be extrapolated, or otherwise fit to a function (whether linear, non-linear, or otherwise) to approximate future current requirements and determine a likelihood that the current requirements will meet or exceed a maximum threshold current. Here, a signal is generated which is indicative that the current will meet or exceed the maximum threshold current such that the preemptive operations may be executed to mitigate, or otherwise reduce, the effect of potential impacted vegetation on the mower.

In various examples, a rapid deceleration indicated by a quick decrease in the blade speed may be indicative of striking an object under the deck of the lawn mower (e.g., a rock, a twig, a manmade object, etc.). In such cases, the blade speed may be immediately reduced to zero, the blade motor may be set to neutral or idle, and the forward progress of the mower may be stopped. Based at least in part on an angle of the blade (as may be determined by a rotary encoder associated with the blade and/or other angular measurement), a relative position of the object may be determined. Additional sensor data (e.g., any one or more of image sensor, ultrasonics, radar, lidar, etc.) may be used to confirm the presence of the object (either tracking the object prior to striking or from sensors located under the deck of the mower). As a non-limiting example, a blade angle of 45 degrees (relative to an axis orthogonal to a direction of motion) may be indicative of an object in the region of the mower under the deck from approximately 45 degrees to an angle which was last cleared by one side of the blade. The blade angle information may then be used, in turn, to determine how to overcome the obstacle (e.g., by backing away and/or otherwise turning the mower while the blade is idled to move past the object). In any such example, blade speed may be increased once a confidence level is higher than some threshold confidence (or likelihood) that the mower is free from the obstacle (e.g., a determination that the mower is no longer traversing an area determined to have a high likelihood of an object). Further, a signal may be generated and sent to a user to have the user inspect the blade and mower manually to check for damage to the mower (whether via an alert system on the lawn mower, the user's personal electronic device, and/or at a remote monitor, etc.).

In some examples, monitoring operation of the mower based on current may provide an indication of a need for repair or replacement of the blade. In some examples, the current and/or torque required to drive the blade may be monitored over time. In at least some such examples, the current and/or torque may be normalized based on, for example, an amount of time between a previous cut, a current location of the lawn mower, a time of year, or the like. Regardless, if an amount of current increases beyond some threshold (which may be a relative change from a previous mow, compared over time—as an average, linear interpolation or extrapolation, etc.), a signal may be generated and sent to a user to have the user inspect and/or replace the blade or other component of the mower.

Regardless of whether mowing operations are reduced based on blade speed, current, torque, etc., the lawn mower may reduce a forward velocity to improve a quality of the cut of grass. In most common gasoline powered lawn mowers, the blade rotation is coupled to the engine crank (by pulley or gear ratios). In those systems, since the lawn mower speed is also linearly related to the engine speed, it becomes impossible for the blade speed to be set independently of the lawn mower speed. However, by driving the blade with an independent motor (electrically, or otherwise), it is possible to decouple the blade speed and lawn mower speed. In additional or alternative examples, a width between stripes of mowing may be reduced (and in some cases stripes may be mowed multiple times) in order to improve a quality of cut.

In such examples, then, if degraded performance is detected (whether via rotation rate or current), as determined above, one or more of the blade speed may be reduced and/or the forward speed of the lawn mower may be reduced (which may be independent of one another). Such forward speed may be a function of the determined blade speed, e.g., a linear function, non-linear function, independent of the blade speed, or otherwise. In various cases, however, the such forward velocity or speed may not be reduced to a value at or below some minimum speed. Such a minimum speed may be determined based on an amount of time required to mow a given area.

In any of the examples described above, speed of the mower may be reduced gradually (e.g., linearly, non-linearly, in steps, etc.), until a corresponding speed of the blade increases to within a threshold of some nominal or desired blade speed. The reduced forward speed of the mower may be maintained for at least a period of time before returning to a nominal forward speed or further reducing such a speed.

In some examples, if an amount of time required to mow a given area meets or exceeds a given time, a deck height may be raised above some desired deck height and the current required to drive the blade and/or the blade speed may be measured. Such a process may be repeated until some maximum height (limited physically or by user definition). In various examples, before raising the deck height, a user may be prompted as to whether the height should be increased. Additionally, or alternatively, the lawn mower may raise a deck height above some desired deck height regardless of blade speed and/or mower speed in attempts to restore performance of the mower.

As a non-limiting example, if a mower deck is currently set at 3" and mowing operations are degraded (whether blade speed has been reduced, current is at or approaching a current limit, or otherwise), the deck may be raised to 4". In at least some examples, despite the fact that the blade is able to spin at a minimum rate (or with a threshold level of current), the total time based on an associated reduced forward speed of the mower may be insufficient. In such cases, the deck height may be raised one or more additional steps in order to minimize (or otherwise optimize) an amount of time required to mow an area. Raising the deck is performed, in such examples, incrementally until the mower is able to restore mowing operations (blade speed spinning at a desired rate, current below a current limit or at or about a desired current, an amount of time to mow an area is minimized, or the like). In such examples, the lawn mower may associate the raised portion with a map such that the mower can later return to those areas to ensure that the grass (or other vegetation) is mowed to the proper or desired height by mowing at the previously desired height. In at least some examples, the mower deck may not be raised above some maximum height. Such a maximum height may be based on a physical limitation of the system, an optimization for mowing time based on deck height, mower speed, and/or number of passes to mow a region, and the like.

In various examples, in response to detecting degraded performance of the mower, any one or more additional actuators may be actuated including, but not limited to, altering a discharge type (rear, side, mulching, etc.), a discharge flap, adjusting a baffle associated with the discharge chute, mechanical scrapers, etc. for clearing an underside of the deck, and the like.

In any such example described herein, the system may impose at least some form of hysteresis. In such examples, one or more of the blade speed, blade height, lawn mower speed, current, or the like may be maintained for a period of time before reverting to a previous value. Once the period of time has elapsed, the system may return the parameters to those previously set or determined. If, while returning to the previous parameters, changes in current, blade speed, or the like are detected, the mower may maintain the altered parameters (reduced blade speed, reduced mower speed, increased deck height, increased current/torque, etc.) for an additional period of time. The system may continuously attempt to return to the default parameters until mowing operations are nominal (e.g., within a threshold amount of calibration values) when mowing under the default parameters. In at least other examples, the system may attempt to return to default parameters based at least in part on map data and/or sensor data. For instance, based on sensor data and/or map data, the system may determine that one or more of: an average height of vegetation is reduced in an area, a type of vegetation has changed, the mower is associated with an area of little to no vegetation, or the like. In such instances, the system need not wait for, or otherwise use, the hysteresis period before returning to the default mowing parameters.

In any one or more of the examples provided herein, the lawn mower may gradually or incrementally return to nominal operating parameters (e.g., parameters for controlling the mower in scenarios in which there is no degradation including, but not limited to, a desired speed, desired blade speed, expected current, discharge type, and the like) through successive periods of time, each period associated with one or more of a set of operating parameters being closer to the nominal operating parameters. As a non-limiting example, upon each time period ending, a forward speed may be increased, a blade speed may be increased, a current may be decreased, or the like, in accordance with a continuous function, a discontinuous function (e.g., stepwise increments per period of time), or the like. In such examples, degradation due to impacted vegetation may be minimized while restoring the lawn mower to such nominal operating parameters.

In at least some situations, the blade may be fully jammed based on vegetation (or otherwise) trapped in the underside of the deck. Such a scenario is detected by determining that the current supplied to the motor for blade rotation and/or a torque associated with the blade is at some maximum level and determining that the blade speed is at or below some minimum threshold speed. Once a full jam is detected, a command signal may be generated which is configured to cause the lawn mower to stop motion, as well as to cause the blade motor (or other blade speed control) to cause the blade to temporarily spin in a reverse direction at a low speed and/or low torque (e.g., 100-500 rpm). In such examples, the reverse speed and/or torque associated with the blades may be limited to ensure that the blade does not unscrew itself. However, in other examples in which the blade is affixed by other means, the reverse speed and/or torque applied to the blade may not be so limited. After a period of time, the mower may attempt to return to nominal operations. If a full jam is still detected, the mower may send a signal to a user indicative of such for manual inspection/removal.

Though techniques are described above with respect to impacted vegetation, the detailed description is not meant to be so limiting. Indeed, other responses to scenarios which may degrade mowing performance are contemplated. For example, in scenarios in which a mower quickly changes orientation (e.g., when the mower is raised and lowered by traversing an obstacle), such orientation changes can cause grass to be cut shorter than intended, possibly damaging that portion of turf. In such scenarios, and as described in detail below, various actions may be performed by the mower sensing either the obstacle or change in orientation including, but not limited to, immediately idling the blades, raising the deck, and the like.

Further, the techniques described in detail herein may also be used, in some examples, to determine when maintenance should be performed on the mower. In those examples above, the current, blade speed, blade height, torque, and the like may be recorded as the mower traverses an area. In at least some such examples, those measurements are associated with a map of the area. The recorded measurements may then be averaged, or otherwise combined (e.g., normalized), based on, for example, a period of time, for a given time of year (e.g., a season), based on a type of vegetation, length of time between cuts, additional sensor data (e.g., camera, radar, lidar, sonar, etc.), or the like. Differences between the currently observed value and the average, or otherwise a trend in the recordings from time to time (e.g., a first derivative indicative of slower blade speeds, increased current requirements, increased torque, etc.) may be indicative of issues with the mower that require maintenance. For example, where the recorded measurement of current required to mow an area is steadily increasing from mow to mow (which may be up to some threshold level), a dulling of the blade may be determined. In such an example, a signal may be sent to a user (located proximate the mower, remote from the mower, etc.) to replace or repair the blade. Once replaced, newly observed measurements of the above referenced parameters may be compared to the previous value to determine if the issue was resolved. In such examples, averaging is restarted from the time when the issue was resolved.

Although described herein with respect to a lawn mower for purposes of illustration, the description is not meant to be so limiting. Any of the techniques, processes, and systems described herein may be used in conjunction with other agricultural and landscaping devices including, but not limited to weed eaters/wackers, edgers, trimmers, and the like, as well as any other power equipment or vehicles having rotary components. Details of such a system are described in detail below with respect to the figures.

FIG. 1 illustrates an example of a system 100 for mowing a region. In the examples illustrated the system 100 may comprise an autonomous lawn mower 102 at least partially capable of performing any number, including all, functions autonomously (e.g., without the need for input from a user), though any other system is contemplated (whether semi-autonomous (having several elements autonomously controlled), manually controlled, or otherwise). Such an autonomous lawn mower 102 may comprise, for example, various sensors and actuators. As non-limiting examples, and as depicted in FIG. 1, the autonomous lawn mower 102 has two distinct drive motors 104A, 104B, each coupled to a wheel. The motors 104A, 104B configured to propel the autonomous lawn mower 102 over a region, including control of orientation, velocity (and/or speed), and other states of the autonomous lawn mower 102. Of course, any other drive mechanism is contemplated (e.g., more than two motors, one motor coupled to multiple wheels, and the like).

The autonomous lawn mower 102 may comprise one or more sensors. As illustrated in FIG. 1, autonomous lawn mower is depicted with one or more Global Navigation Satellite System(s) (GNSS) 106, image sensor(s) 108 (which may be RGB, monochromatic, infrared, ultraviolet, etc., as well as form the basis of stereo—(as depicted) or multi-view systems), and radar(s) 110. Though not depicted, the autonomous lawn mower 102 may comprise any other form of sensor for detecting environmental parameters and/or a state of the autonomous lawn mower 102 such as, but not limited to, lidar(s), inertial measurement unit(s) (IMU), accelerometer(s), gyroscope(s), magnetometer(s), wheel encoder(s), ultrasonic transducer(s), thermal imagers, ambient light sensor(s), time of flight sensors, barometer(s), bolometer(s), pyrometer(s), tilt sensor(s), and the like. Such sensors may be disposed about the autonomous lawn mower 102 in poses (i.e. positions and/or orientations) determined to optimize a field of view of all such sensors when combined. Image sensors 108 may comprise narrow field of view cameras and/or wide-angled cameras. Multiple image sensors 108 may be disposed about the mowing device 102 to create various baselines (including dual baselines). All such sensors may be calibrated to determine one or more of intrinsics or extrinsics of the sensors.

The autonomous lawn mower 102 may further comprise, as depicted in the example illustrated, one or more antennae 112. Such antennae 112 may be used for one or more of wireless network communication, GNSS/GPS satellite reception, or any other form of electromagnetic signal transmission/reception.

The autonomous lawn mower 102 further comprises a deck 114. The deck 114 provides a housing for one or more blades in order to protect nearby objects from injury, to protect damage to the blades, as well as to control how vegetation is cut and directed after cut (e.g., to be ejected as mulch from the side of the deck 114, collected in a bag, or otherwise).

Whereas, at least in the example illustrated, rear wheels of the autonomous lawn mower 102 may be driven by independent motors 104, the front wheels 106 (left front wheel not visible in FIG. 1) may be completely passive. Such front wheels 106 may comprise castors to enable the autonomous lawn mower 102 to turn easily with very small radii of curvature. Of course, any combination of passive and/or actively driven wheels is contemplated. As will be described in detail below, such front wheels 106 may be associated with one or more of the sensors described in detail above. Further, such sensors associated with the one or more front wheels 106 may, in some examples, comprise an orientation sensor (e.g., any one or more of a gyroscope, magnetometer, accelerometer, tilt sensor, or any other sensor which may provide orientation through direct measurement or indirectly with other measurements).

As further illustrated in FIG. 1A, autonomous lawn mower 102 is attempting to mow a region of high grass 118. When operating properly, the autonomous lawn mower 102 should trim vegetation to a uniform desired height, such as in illustrated in cut region 120. However, vegetation, such as those in the region of high grass 118, may become impacted in the deck 114, causing the blade to slow or stop and/or preventing proper mulching. Techniques described below (e.g., with respect to any of FIGS. 3-5) may prevent, mitigate, or otherwise remediate such impacted vegetation.

Figure 1B:
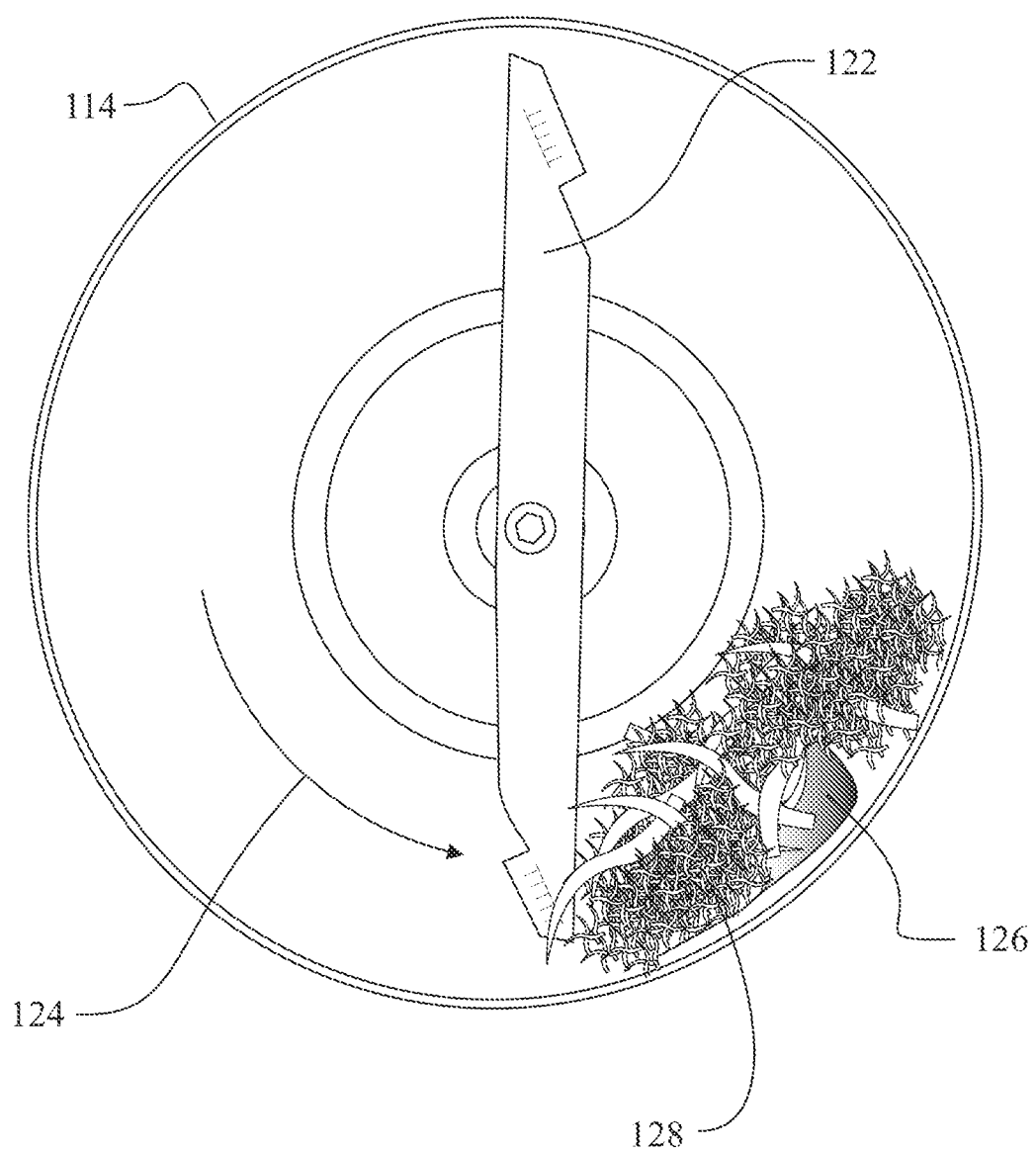
FIG. 1B depicts an underside of a blade portion of the autonomous lawn mower of FIG. 1A illustrating the impacted vegetation due to mowing in high grass areas.

FIG. 1B illustrates the underside of the lawn mower, such as autonomous lawn mower 102, when it becomes impacted with vegetation. As depicted, a deck 114 may house a blade 122. Of course, though depicted as a circular deck for illustrative purposes, deck 114 need not be so limited. Indeed, any deck shape (which may accommodate any number of blades in any configuration) is contemplated. Blade 122 may be pitched or otherwise shaped for optimal aerodynamic and/or cutting efficiency such as, but not limited to, comprising a pitch or shape for generating force (e.g., aerodynamic lift) perpendicular to the direction of motion of the blade 122. When driven (e.g., by a separate motor coupled to blade 122 and/or by a pulley/gear system coupling to a motor shared with the propulsion mechanism), the blade 122 may spin in direction 124 (e.g., counterclockwise from the view depicted in FIG. 1B).

As further shown, the deck 114 comprises opening 126. While in operation, vegetation trimmed by blade 122 is forced to exit through the opening 126 (e.g., for a discharge chute), either to be collected in a bagging system (not shown), or sprayed over the turf for mulching. However, when operating in certain conditions (e.g., high grass, rough vegetation, etc.), vegetation 128 may impact the mower. As illustrated here in FIG. 1B, vegetation 128 is unable to pass through the opening 126 which, in turn, has caused the blade 122 to slow down and/or stop as it continues to impact the vegetation 128. As discussed in detail above, due the vegetation 128, the mowing operations will be degraded by, for example, not trimming an area, trimming an area suboptimally, and/or not mulching an area. In some examples, clumps map be ejected at once (as opposed to spread evenly, for example) creating conditions which may result in damage of the underlying turf. Any such impact will result in longer mowing times, reduced efficiencies, additional power consumption, and potentially even destroyed turf.

Figure 2A:
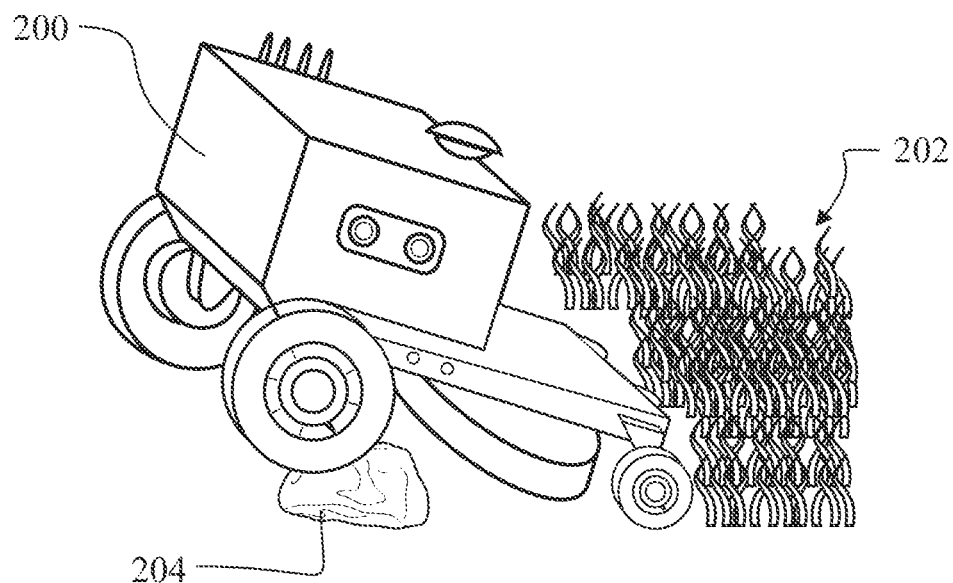
FIG. 2A illustrates an example in which a change in orientation of a lawn mower causes cutting turf shorter than intended.

FIG. 2A depicts an example of a lawn mower 200 mowing a region 202 of high grass or otherwise thick vegetation. As illustrated, while mowing, the lawn mower 200 may traverse over an obstacle, such as obstacle 204 (here, a large rock). Traversing the obstacle 204 causes the lawn mower 200 to change orientation such that the lawn mower 200 is no longer aligned with the surface to be cut. Such orientation changes may be detected (as will be described in detail herein) based on the one or more sensors as described in FIG. 1 and throughout the specification.

Figure 2B:
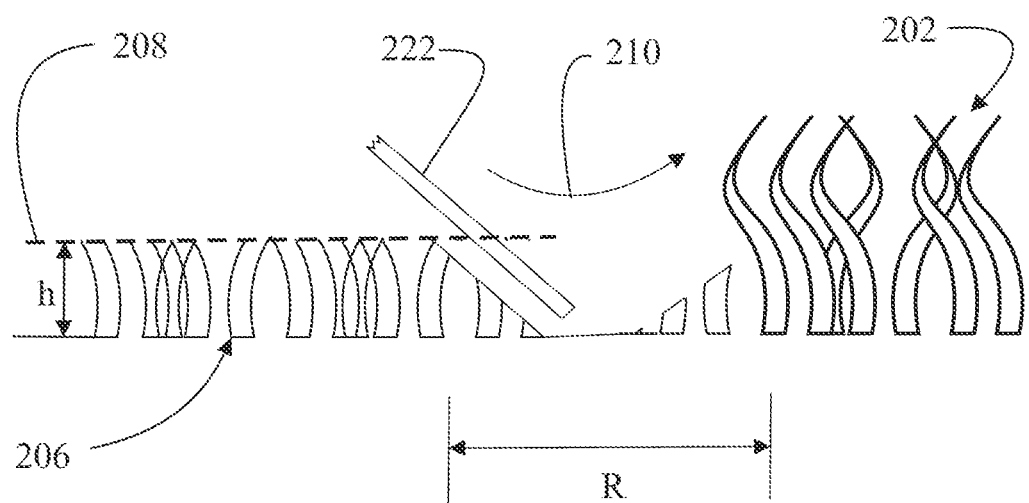
FIG. 2B illustrates a close-up side view of the turf during the change in orientation depicted in FIG. 2A.

FIG. 2B illustrates the result of the orientation change depicted in FIG. 2A when traversing over the obstacle 204. Initially, the lawn mower 200 may be configured such that a height, h, of cut grass 206 does not exceed a set height 208. When mowing region 202 and an orientation change of the lawn mower 200 is induced (e.g., by traversing the obstacle 204), a blade 222 of the lawn mower 200 may pitch forward by some amount resulting in the vegetation being cut shorter than the height, h, and potentially even down to the ground level. This pitching forward may continue until the lawn mower 200 finishes traversing the obstacle 204, following a path indicated by direction 210. While following path 210 (whereby the blade 222 starts in a declined pitch and slowly returns to being level with the ground surface), turf may be cut below (and/or well below) the desired height, h, leaving a region, R, which is heavily undercut. As will be discussed in detail below, detection of such orientation changes may be used to control the lawn mower 200 in order to minimize and/or eliminate regions of undercut or undercut grass, such as region R.

Of course, though depicted in FIG. 2B as an orientation change due to traversing an obstacle for illustrative purposes, the example is not meant to be so limiting. In additional or alternative examples, the same or similar processes may occur from changes in orientation of the surface upon which the mower is mowing. In such an example, a relatively change of orientation of the surface (such as when the mower approaches a hill, sloping incline, or otherwise) may cause similar problems as those illustrated when traversing an obstacle. In such a case, the orientation may be measured either with respect to the surface and/or changes in the orientation of the surface proximate the mower may be determined. Upon such orientation changes, whether due to a change in orientation from traversing an obstacle, changing orientation of a surface upon which the mower is traversing, or otherwise, the examples set forth herein may remediate (or otherwise limit) any damage by autonomously controlling any one or more of the blade speed, blade height, or deck height during those periods.

Figure 3:
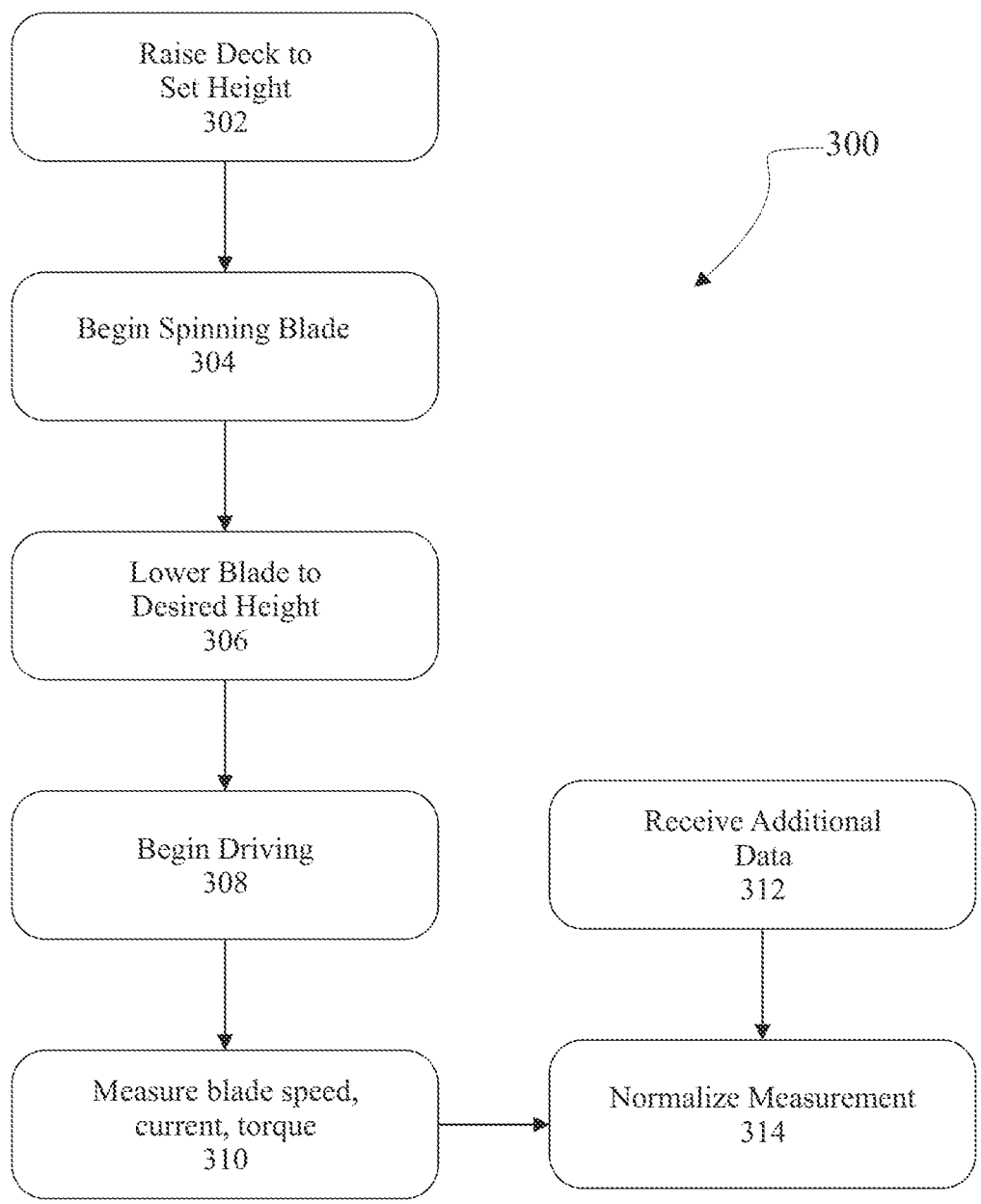
FIG. 3 depicts an example flow diagram for calibrating a lawn mower for detecting impacted mower operation.
Figure 4A:
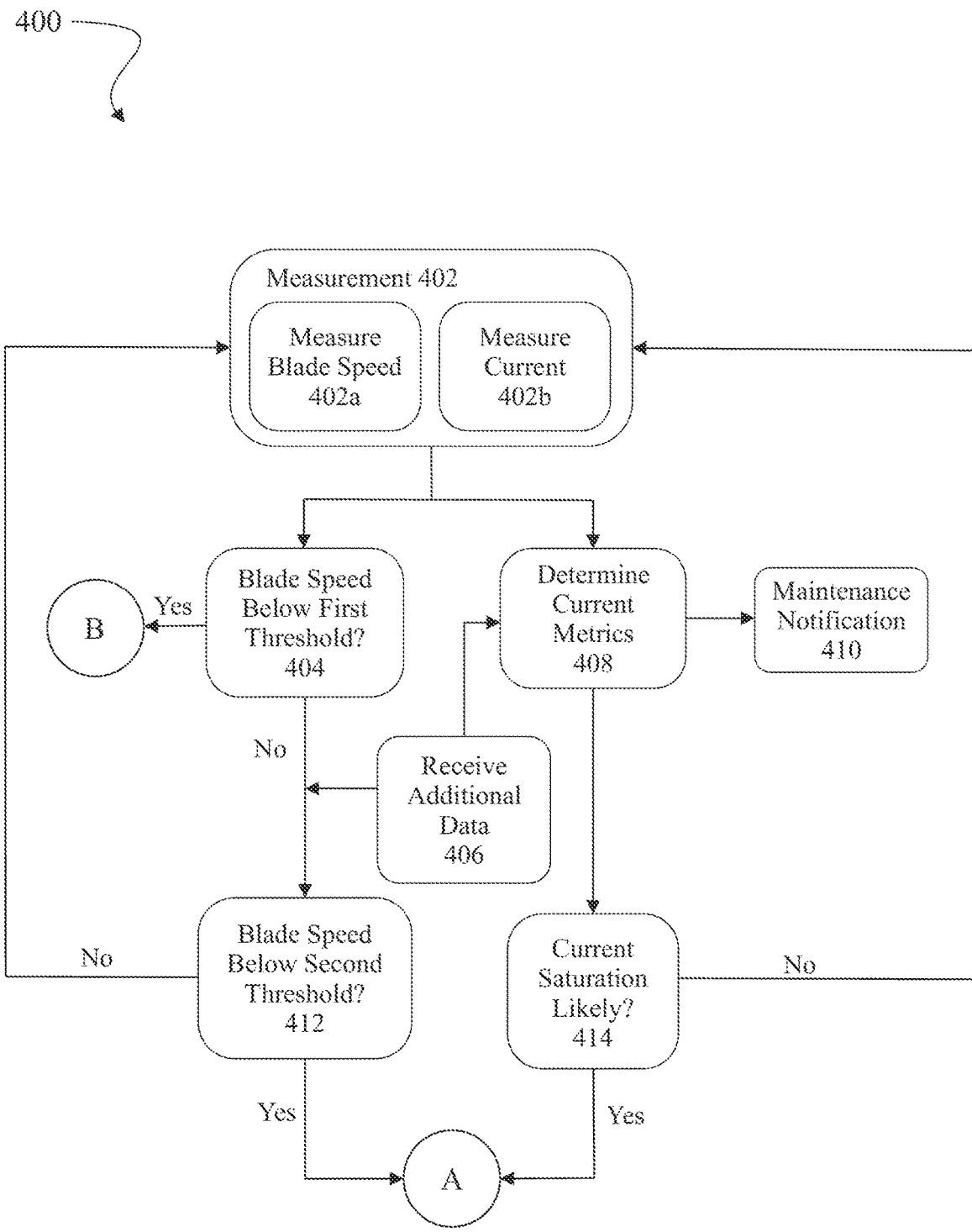
FIG. 4A depicts an example flow diagram for detecting whether a lawn mower is impacted by vegetation.
Figure 4B:
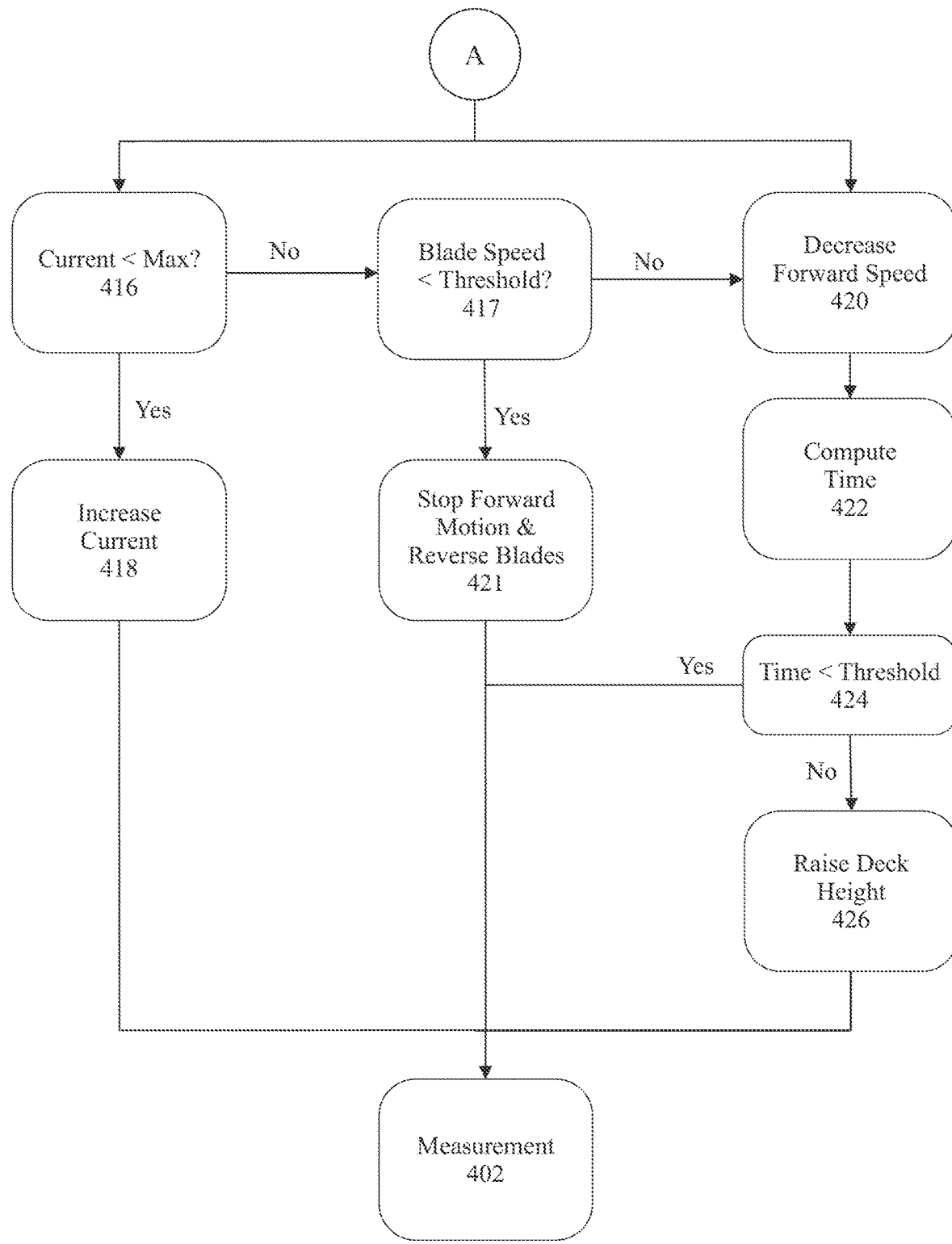
FIG. 4B depicts an example flow diagram for controlling a lawn mower in response to detection of impacted vegetation from FIG. 4A.
Figure 4C:
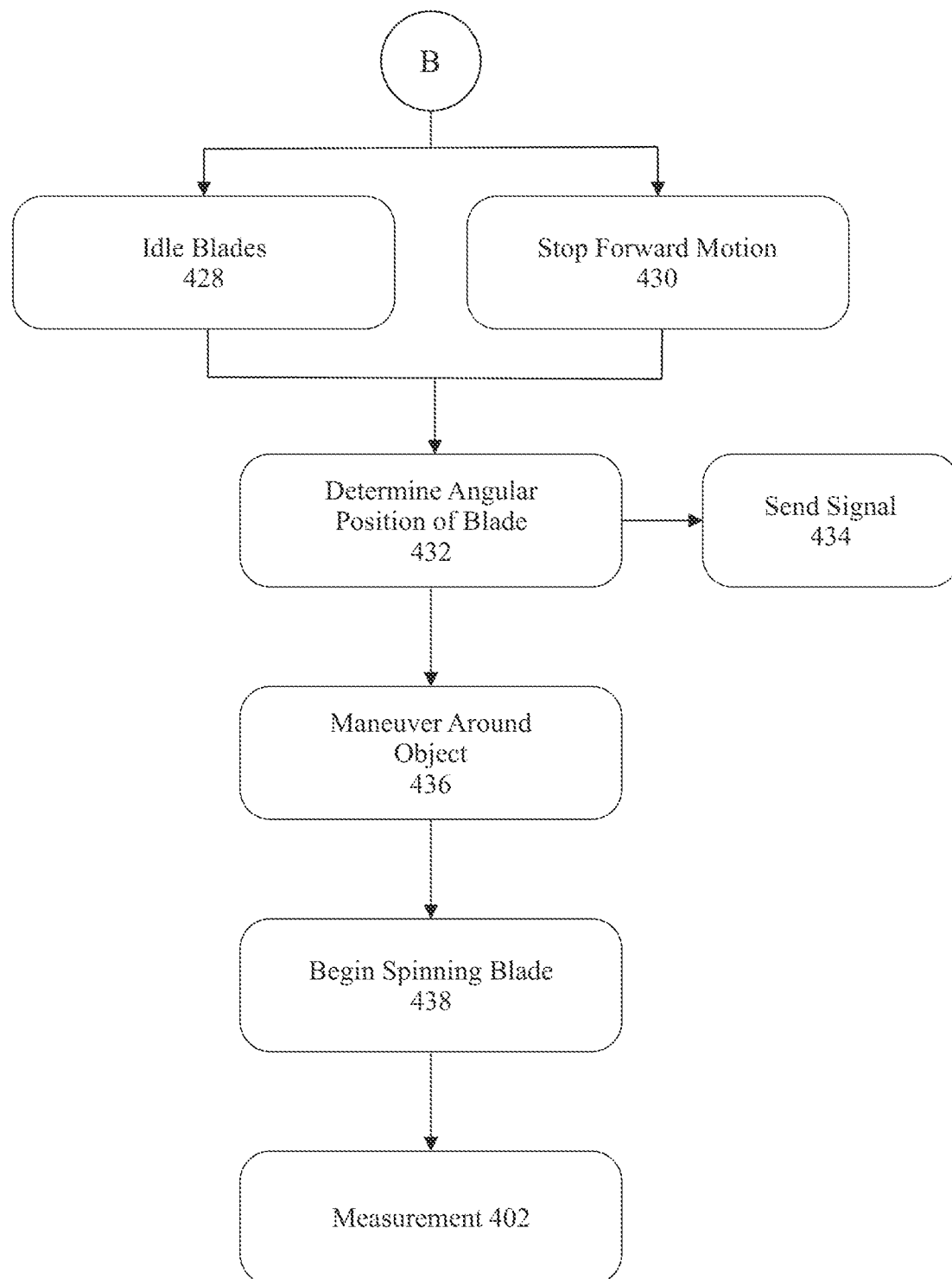
FIG. 4C depicts an example flow diagram for controlling a lawn mower in response to detecting an obstacle from FIG. 4A.
Figure 5:
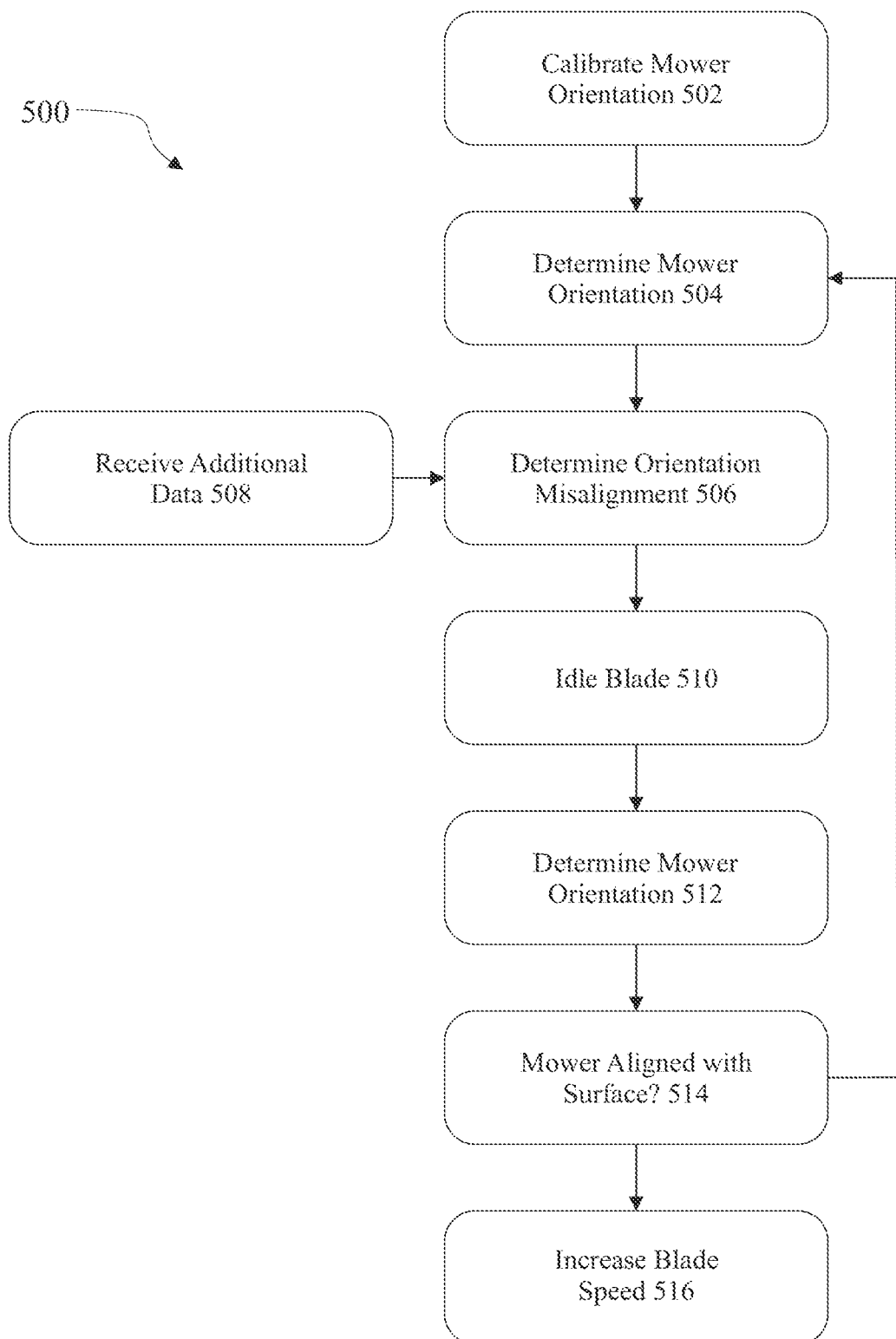
FIG. 5 depicts an example flow diagram for controlling a lawn mower in response to a change in orientation.

FIGS. 3-5 illustrate example flow diagrams representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e. within technical tolerances of processors, etc.) to perform the operations described herein. Further, in those systems with more than one blade, the following operations depicted in any of the flow charts herein may be performed based on any one or more blades.

FIG. 3 illustrates an example 300 for calibrating one or more of a current required to spin a blade, an associated torque, and/or an associated blade speed during mowing operations. Such calibrations may be performed upon initialization of a new lawn mower, during occasional mows, between repair/replacement, or before each and every mow, or any other combination. As above, where more than one blade exists on the mower, the calibration may determine calibration data or parameters to associate with each of the one or more blades. Further, any one or more of the blades may comprise varying pitch (which, in turn, may generate varying lift), width, material, material propertied, and the like that may impact torques and/or currents required for turning the blade. The following calibration procedure is able to define calibration parameters for any and all blades, regardless of such physical parameters.

As illustrated, at 302 a lawn mower controller instructs actuators associated with a deck of a lawn mower to raise the deck to some set (calibration) height. The set height may be provided by a user or otherwise be the maximum height the deck is able to rise. Maximum height may be determined in some examples by a limit switch, linear encoders, or the like.

Once the deck is at the set height, a blade of the mower may be spun to a desired speed for mowing at 304. In some examples, the desired speed is around 1,000 to 3,000 rpm, though the speed may be varied based on, for example, the type of vegetation to be mowed (e.g., St. Augustine grass, bahia grass, Kentucky blue grass, etc.), a length and/or thickness of the vegetation, an orientation of the mower, and the like. After the blade speed reaches the desired speed, flow proceeds to operations performed at 306.

At 306, the deck may be slowly lowered to a desired cutting height. The desired cutting height may be input by a user, determined based on the type of grass, received from map data associated with a position of the lawn mower, or otherwise. When the deck reaches the preferred or desired cutting height, the lawn mower controller generates a signal to cause the mower to move forward at 308. In various examples, the speed at which the mower moves forward is a nominal speed determined to mow a given area.

At 310, one or more of a current required to drive the blades at the desired speed, an instantaneously measured blade speed, and/or a torque required to turn the blades may be measured. Such measurements may comprise, for example, ammeters, Hall angle sensors, rotary encoders, force sensors, sensors to monitor back electromotive force (EMF), and the like. Measurements may be generated at various frequencies associated with the one or more sensors and further associated with a time stamp. Measurements may be stored on a memory storage device accessible to the lawn mower or otherwise transmitted to a remote device for storage and/or processing.

At 312, additional data is received (either at the lawn mower and/or at the remote device). Such additional data may comprise, for example, additional measurements over a period of time from beginning to mow (e.g., a period of 5 s, 10 s, 1 min, etc.), additional sensor data (e.g., GNSS, image data, radar data, etc.), measurements from a previous mow (at a similar time of year, etc.), and the like.

At 314, measurements are normalized, or otherwise combined, based on the additional data. For example, an average current required over the period of time measured may be determined. Similarly, such an average may be performed based on location, time of year, environmental properties (such as vegetation height, thickness, an amount of moisture, and the like), or otherwise. Combinations may comprise a weighted average (e.g., whereby more recent measurements are weighted more heavily, older measurements are weighted more heavily, etc.), perform outlier rejection, and/or rely on any other function or statistical method. After data collection and/or normalization, such normalized or combined data may be stored (either locally to the lawn mower or remotely) as calibrated data. Such calibrated data may then me made available to the lawn mower (or any other lawn mower), whether wired, wirelessly, or otherwise.

As above, any one or more steps may be performed locally at the lawn mower (e.g., using one or more processors and memory accessible to the lawn mower) and/or on a remote device (e.g., a remote computing system).

FIG. 4A-4C depicts an example process 400 for determining whether a mower is impacted by vegetation and the corresponding controls for remediating or resolving the impact. As above, where more than one blade is used, the processes described in detail below may be applied to any one of the blades separately. As a non-limiting example, if any one blade meets the criteria set forth in FIG. 4A (which may be with respect to the individual blade's calibration data), all operations of any of FIG. 4B or 4C may be performed. Of course, other combinations are contemplated such as, but not limited to, averaging the blade speeds and/or currents for comparison.

Further, where the term "current" is used herein, the description is not meant to be so limiting and is only provided for ease of description. Current may generally refer to a drive control characteristic and comprise any one or more of an average and/or instantaneous amount of current used (e.g., a current supplied to a motor), a duty cycle in the case of motors which use pulse width modulation for control (such as, but not limited to brushless DC motors), a frequency, I-V (current/voltage) phase, or the like. Additionally, various differing and/or multiple drive control characteristics may be used for different operations described herein. As a non-limiting example, monitoring of current (e.g., in 402 below or in FIG. 3) may comprise an average current supplied to a blade motor, whereas increasing an amount of current (e.g., in 418) may comprise altering a duty cycle.

Turning first to FIG. 4A, process 400 may be run whenever a lawn mower is operating. In any example, lawn mower operations may comprise forward motion of the lawn mower, as well as spinning the blade at a desired (or set) blade speed and at a desired (or set) blade height in order to mow a given area. In at least some examples, such desired speed, height, forward motion, etc., may be based on user input, nominal operating parameters for the mower, and/or based on a location or type of vegetation to be mowed. At 402, a measurement may be made of one or more of blade speed and/or a current. Such measurements may be performed substantially simultaneously and/or asynchronously (e.g., depending on the frequency with which sensors perform measurements and/or such speed or currency is determined based on the associated sensor data). Blade speed may be measured at 402*a* by, for example, any one or more of encoders, back EMF, Hall sensors, or the like. Current (and/or torque) is measured at 402*b* by any one or more of an ammeter, power sensor, force (or torque) sensor, or the like. In various examples, such blade speed and/or current may be associated with a map of the area, as well as any other sensor data or derivatives therefrom. Such association may be performed on the lawn mower itself, or otherwise transmitted to a remote computing device for processing (including performing calibrations with respect to position and/or additional sensor data, as described with respect to FIG. 3).

At 404, a determination may be made as to whether the blade speed (as determined in 402*a*) is below a first blade speed threshold. For example, a blade may have a nominal blade speed when mowing and the first blade speed threshold may be substantially below the desired (or set) blade speed, e.g., 0 rpm. In at least some examples, the determination made at 404 may be with respect to a previously measured (e.g., most recently measured) blade speed. As a non-limiting example, a determination may be made with respect to whether a difference between the most recent previously measured blade speed and a currently measured blade speed is greater than or equal to a threshold difference in blade speed. In yet other examples, such comparison may be over a period of time, or otherwise. The threshold (or threshold difference) may be determined based on an associated deceleration to the blades due to striking an object. If the blade speed doesn't meet or exceed the first threshold blade speed (or, if the difference or otherwise meets or exceeds the threshold difference), operations may proceed to those operations described with respect to FIG. 4C, as indicated by element "B" and the corresponding element in FIG. 4C.

At 406, additional data may be received. In various examples, such additional data may comprise, but is not limited to, any one or more of calibration data (as may have been determined in accordance with FIG. 3, sensor data (e.g., any one or more of image data, lidar data, radar data, or the like), map data, or any other additional data source. Such additional data may comprise, but not be limited to, a type of grass (e.g., Bahia, St. Augustine, Ky. blue grass, etc.), as an expected speed and/or current/torque requirement may be based at least in part on the grass type. In various examples, the additional data may comprise information about the blade used (e.g., a blade type, an amount of lift, a blade material, a blade thickness, elasticity, total length, and the like). In at least some examples, such additional data may be used to determine an expected blade speed (and/or associated current or torque required). As a non-limiting example, expected blade speed may be based on a type of vegetation detected in image data, a location of the mower and associated with the map data, the calibrated blade speed/current/torque from a calibration step, or the like. In those examples having multiple blades, the calibration data associated with any one or more of the blades may be received. In various examples, the expected blade speed may vary over the course of operations. As non-limiting examples, the expected blade speed may be linearly or non-linearly increased and/or decreased, whether continuously or discontinuously, to ensure that there is more correction as the difference between a measured speed and an expected speed increases.

At 412, a determination is made as to whether the measured blade speed is at or below a second threshold blade speed. Such a second threshold blade speed may be the expected blade speed (e.g., based on the additional data received in 406) and may include a buffer (either as a fixed amount, a percentage of the expected blade speed, or the like). For example, if the expected blade speed is 3000 rpm, the second threshold may be set as 98% of the expected blade speed to allow for some variability in turf. In additional or alternative examples, a change in blade speed over time may be monitored. In at least some examples, a determination is made at 412 as to whether such a change (or difference) over a period of time (including from measurement to measurement) meets or exceeds a second threshold difference. If the expected blade speed is less than or equal to the second threshold (or a change in blade speed is greater than or equal to the second threshold difference), flow may proceed to the operations described with respect to FIG. 4B, as indicated by element "A" and the corresponding element shown in FIG. 4B. Otherwise, flow may return to measurement 402 as long as the mower is still operating.

Similar determinations may be performed with respect to current as to blade speed for determining an indication of whether a mower is impacted due to vegetation (or has some other issue). Returning to 402, as measurements of current are determined in 402*b*, metrics regarding the current may be determined at 408. Such determinations may be made substantially simultaneously with those operations on blade speed (such as either one or more of 404 or 412), asynchronously, or independently. Regardless, such metrics may comprise, the determined or measured current itself, a rate of change of current, one or more of a linear or non-linear fit of the current over a period of time, an extrapolation of the current, or otherwise. As with respect to blade speed determinations, additional data is received at 406 which may comprise, for example, any one or more of an calibration data including a calibrated current draw, historical currents (or power, torque, etc.) required to mow a similar or same area, sensor data (image data, lidar data, radar data, etc.), an indication of vegetation type, or the like. If, a trend of the historical currents (which includes the instantaneous current measured) is increasing and/or increases to or above a threshold current, it may be indicative that the associated blade is wearing down, broken, or otherwise needs repair/replacement. In such an event, a maintenance notification message indicative of such may be sent to a user at 410 to inspect, repair or replace the blade. Once repaired or replaced, calibration may be reperformed before continued mowing.

Regardless, flow may proceed to 414 where a determination is made as to whether current saturation is likely, or otherwise whether a determination of an impacted mower may be made based on sensed current (and/or associated torque). In some such examples, it may be beneficial to take remedial actions in advance of the lawn mower reaching a predefined current limit to reduce a likelihood of damage to the mower and increase safe operation of the mower. In such examples, a curve fit to a sequence of measured currents (linear, non-linear, or otherwise) may be used to extrapolate current requirements to continue to operate the mower at a desired (or set) blade speed. A likelihood of saturation may be determined if the curve fit to the current measured over a period of time (e.g., previous 5 s, 10 s, 30 s, 1 min, etc.) indicates that the current requirement will surpass a maximum current threshold within a given period of time (e.g., extrapolated forward in time by a given amount). If either a likelihood is determined, or the measured current itself meets or exceeds a threshold current, flow may proceed to the operations described with respect to FIG. 4B, as indicated by element "A" and the corresponding element shown in FIG. 4B. Otherwise, flow may return to measurement 402 as long as the mower is still operating.

FIG. 4B depicts that portion of flow diagram 400 for controlling the lawn mower in response to detecting impacted mowing (either due to lower blade speed or higher current/torque requirements). Flow 400 continues from A to either one or more of operations 416 and/or 420. Though depicted in FIG. 4B for illustrative purposes as performing both operations, either operation and/or both operations may be performed in various examples. At 416, the system may determine whether the current is less than or equal to a maximum current draw. This comparison may be performed for safety reasons, to ensure that too large of a current doesn't damage components of the lawn mower, as well as because adding additional current past some threshold maximum current may not create any additional torque or blade speed. If the current is less than or equal to the maximum, or threshold, current, an amount of current supplied to the motor associate with the blade may be increased at 418. Such an increase in current may be linear, non-linear, incremental in steps, or otherwise. In at least some examples, the increase or correction (whether to current, torque, blade speed, etc.) may not be static but instead be altered (e.g., increased or decreased whether continuously, discontinuously, stepwise, or the like) during operations such that compensation to degraded performance is altered based on continued operations. As a non-limiting example, an amount of additional current applied may be either increased or decreased based on operations and/or additional data received (e.g., additional data of 406).

If, however, the current meets or exceeds some maximum or threshold current, flow proceeds to operation 417. Here, the system may determine whether the blade speed is less than or equal to some threshold blade speed. As a non-limiting example, the threshold blade speed for comparison in 417 may be 90% of the desired blade speed discussed with respect to FIG. 4A. If the current blade speed is less than or equal to the threshold, it is likely that the mower is completely jammed and flow may proceed to 421. At 421, the mower forward motion may be completely stopped and the blades may be spun at one or more of low speeds or low torques in a reverse direction. As a non-limiting example, such a blade speed threshold may be between 500 rpm (whereas nominal blade speed may be 1000-4000 rpm) and the speed at which the blades are spun in reverse may be between 100-500 rpm, though other speeds are contemplated. Once spun in reverse for a period of time or number of revolutions, the lawn mower system is returned to nominal operations and returns to 402 to continue monitoring one or more of the current and/or blade speed while the mower is operating.

If, on the other hand, the blade speed is not less than or equal to the threshold blade speed, this may be indicative of the fact that the mower is not fully jammed and is still able to mow. As such and/or regardless of proceeding via 416 and 417, the mower may decrease a forward speed at 420. Such a decrease in forward speed may be linear, non-linear, step-wise, or some other function from the previous speed. In various examples, the forward speed may be directly or indirectly determined (linearly (e.g., proportional), non-linearly, or otherwise) with respect to the blade speed. In at least some examples, as illustrated, the forward speed may be maintained at a maximum ground speed until a maximum blade speed is reached as the blade speed is throttled (e.g., by increasing current at 418). In at least some examples, the maximum blade speed may be based at least in part on an American National Standards Institute (ANSI) maximum safe speed which, in some examples, is 2900 rpm. As such, the techniques described herein allow for the use of medium left blades, which, in turn, extend battery life, quality of cut, and productivity.

At 422, a time to mow a given area is computed based at least in part on the reduced blade speed. In such an operation, the amount of time may be based at least in part on a coverage plan for the mower to reach every portion of a given area, the width of the mower, and/or the reduced speed.

At 424, the time to mow may be compared to a threshold time to mow. For example, in some examples it may be important to ensure that the area will be mowed within a given time. If the amount of time is less than or equal to such a threshold time, the mower may continue operating at the reduced speed and return to monitor the current and/or blade speed by returning to 402. In various example, the forward speed of the mower may not be reduced lower than a threshold speed which may be either predetermined or input by a user. At least in some examples, the mower may maintain such a blade speed and/or mower speed for a period of time (e.g., 5 s, 30 s, 5 min, etc.) or until an event occurs. As a non-limiting example, the event may comprise one or more of the blade speed increasing (and in some examples to within a previously measured or calibrated blade speed) and/or an amount of current required to drive the blade at the same speed being reduced.

If the amount of time to mow at the reduced speed is more than or equal to such threshold time, the mower may proceed to 426 where a blade height may be raised by raising the deck. The deck is raised, in various examples, according to linear, non-linear, step-wise, or the like. In at least some examples, a user may be prompted before the deck is raised. As a non-limiting example of such, a user may be prompted prior to raising the deck height from 3" to 4". Regardless, there may be a maximum blade or deck height that may be based on one or more of physical limits (e.g., the deck is only able to be raised to some maximum height) or otherwise some user defined maximum height (e.g., a user instructs the mower that any higher is unacceptable for mowing.

In any of the examples above, adjusting the blade height (or deck height) may result in a step, or bump, in the area to be mowed. In such examples, the deck height used to cut a given area may be associated with a map. Once mowed at an elevated deck height, the map may then be used to compare those regions of the area to be mowed which are taller than a desired or set height (e.g., due to the deck being raised). In such examples, the lawn mower may either flag a user to return to those higher areas and lower the deck height or autonomously plan a trajectory to follow to return to those regions with the lowered deck height. In at least some examples, such mapping and returning may occur multiple times as the deck height is slowly lowered from pass to pass until a desired or set height is attained.

As with the forward mower speed and/or blade speed, the deck height may be returned to a desired or set blade height (or some portion of a current height) after a period of time (e.g., 5 s, 10 s, 1 min, 5 min, etc.) or until an event occurs. In various examples, such an event may be, for example, an increase in blade speed, a decrease in an amount of torque on the blades, a decrease in an amount of current required to drive the blades at the desired speed, or the like. The blade may be lowered to the desired (or set) blade height and/or to one or more intermediate heights for multiple periods of time until nominal operation is observed.

In at least some examples, such a system may allow a user to provide additional input when performing the determinations described in detail above. As a non-limiting example, such a system may receive input from a user with regard to prefer a quality of cut or a time to cut. As a non-limiting example, a user may input a signal indicative of preference to minimize a time to cut. In such an example, optimization performed above may favor forward mower speed over blade speed and/or blade height (e.g., by upweighting a penalization for total mow time higher or downweighting a quality of cut metric (e.g., as may be determined based on a consistency of height over an area, number of jams, blade speed (where a higher speed is indicative of a better cut), a difference between a desired discharge type and an actuated discharge type, or the like, including any combination of the above). When downweighting height consistency, the mower may not return to those areas which have differing heights. When preferring quality, a minimum forward speed may be reduced and maintaining a blade speed may be preferred over forward mower speed and/or altering deck height from a desired (or set) height. Similarly with the preference for mow time, a penalty for optimization of mow time may be downweighted whereas a penalty for deviating from a desired height, a consistency of height over an area, deviation from a desired or set blade speed, etc. (any combination of which comprising a quality metric) may be upweighted in such an optimization. In at least some such examples, such an optimization may comprise, for example, determining to increase an amount of overlap between stripes (including mowing a stripe multiple times) in response to detecting the degraded mowing performance.

Though not depicted in FIG. 4B, additional remedial measures may be taken in an attempt to improve a quality of cut and/or restore mowing operations from a detected degradation. As a non-limiting example, in addition to, or alternatively to, raising the deck height in 426, one or more additional actuators may be actuated. Such actuators include, but are not limited to, any combination of one or more actuators associated with the discharge system to, for example, change a discharge type (whether rear, side, mulching, or the like), a discharge flap, and/or an interior baffling configuration associated with the discharge chute (e.g., fully open, closed, partially open, etc.), additional motors for scraping an interior portion of a deck of the lawn mower, or the like.

FIG. 4C depicts an example flow diagram 500 for controlling a lawn mower in response to detecting an obstacle. As above, the method illustrated by FIG. 4C may be performed in response to detection of high deceleration of the blade speed (as shown with respect to FIG. 4A). Such a high deceleration may be indicative of the lawn mower hitting an obstacle with the blade (either because the obstacle was not previously detected, due to an error in the system, or the like). Regardless of the source of deceleration, performing the operations of FIG. 4C may, in such instances, improve the safety of the system and reduce damage to the system.

As shown, and in response to the large deceleration indicated by "B" (from FIG. 4), the system may immediately (and/or substantially simultaneously) idle the blades 428 and/or stop forward motion 430 of the lawn mower.

At 432, a position of the blade may be determined based on, for example, a rotary encoder, Hall sensor, angle sensor, or otherwise. The blade angle is then used to determine a portion under the deck in which an obstacle is likely. As a non-limiting example, a blade having an angle of 45 degrees relative to a direction of motion may be indicative of an obstacle in the region from 45 degrees to 225 degrees from the direction of motion. In additional or alternative examples, previous positions of the lawn mower and previous rotations of the blade are used to determine the area, reducing the area associated with a likelihood of an obstacle from the angle of the blade alone.

At 434, a signal is transmitted to a user to provide notification of a likely impact. The signal may cause the user to later inspect the blade and/or the area associated with the impact (as may be included in the signal and determined from by the lawn mower).

At 436, the mower may use the area having a likelihood of an object or obstacle to determine a trajectory for overcoming the obstacle. Such a maneuver may comprise, as non-limiting examples, any one or more of reversing a mower direction, raising a deck height, etc. while maintaining the blade speed idled. Once past the region having a likelihood of an object, the mower may begin spinning the blade 438 and otherwise operating nominally (and/or according to parameters used prior to the detection of a high deceleration event). After returning to such parameters, flow proceeds to operation 402, where measurements are performed. After performing the maneuver, if measurements made or determined in 402 (of one or more of the blade speed, current, torque, etc.) are still indicative of a degradation of mower performance (e.g., as may be determined in FIG. 4A), the threshold in 417 of FIG. 4B may be increased, as the degradation detected above may be more likely due to impacted vegetation as opposed to a blade collision with an obstacle. Otherwise, if mowing operations are restored to nominal (within some threshold and as may be determined based on measurements 402), a likelihood of an impact with an obstacle may be increased.

FIG. 5 is an example process 500 for controlling a lawn mower based on a change in orientation. Such a process may begin by calibrating a mower orientation at 502. Calibrating the orientation at 502 comprises, in at least some examples, determining the state of the lawn mower including any one or more of a roll, pitch, and/or yaw orientation and/or the surface orientation (e.g., normal) of one or more of a surface upon which the mower is currently positions or a surface proximate the lawn mower in a direction of travel of mowing. Measurements may be taken from one or more sensors onboard the lawn mower (as described in detail herein) including, but not limited to, inertial measurement units (IMUs) (which, in turn, may comprise any one or more of accelerometers, gyroscopes, magnetometers, and the like), tilt meters, image sensors, lidar, radar, ultrasound, and the like. Such measurements may be filtered (e.g., by a Bayesian filter, such as a Kalman filter, averaged, or otherwise processed) to remove noise. Calibration may comprise determining any one or more of biases, drifts, error, offsets, or otherwise with respect to any one or more of the associated sensors for determining an orientation of the lawn mower.

Once calibrated, the lawn mower may, at 504, may continuously measure a current orientation of the lawn mower (e.g., while mowing or otherwise traversing an area) using at least a subset of the sensors used for calibration and determine, based on the calibration, an orientation of the mower. Measurement at 504, in some examples, may comprise the same, or similar, filters or error rejection used in calibrating the sensors.

At 508, the lawn mower may receive additional data. As a non-limiting example, the system may receive additional sensor data (image data, lidar data, radar data, ultrasonic data, time of flight data, and the like), map data, or otherwise to determine an orientation of the surface upon which the lawn mower is travelling and/or a portion of the surface proximate the mower (e.g., along a direction of travel of the mower).

At 506, the system may determine a misalignment between the lawn mower and the surface and/or a difference in orientation between a surface on which the mower is currently mowing and a surface proximate the mower in a direction of travel of the lawn mower. In at least some examples, this comprises determining a difference between the orientation of the lawn mower and an orientation of the surface, a difference between an orientation of the mower and an orientation of the surface proximate the mower along a direction of travel of the lawn mower, or a difference between an orientation of the surface on which the mower is currently positioned and an orientation of the surface proximate the mower in a direction of travel of the mower. If the difference meets or exceeds a threshold difference, a misalignment is determined. In additional, or alternate, examples, such a misalignment may also be determined based at least in part on a rate of change of the orientation described in detail above. As a non-limiting example, large orientation changes in a short period of time, e.g., from one measurement of orientation to the next, (and/or large orientations in the absolute without reference to a change in orientation, can be used alone as a signal indicative of misalignment and/or a rapidly changing surface orientation. In any of the examples above, a relative orientation of the lawn mower with respect to the surface (and/or a relative orientation of one surface with respect to another portion of the surface) may be used in addition, or alternative to, an absolute difference in orientation.

At 510, if a misalignment is determined, the blade of the mower may be instantaneously idled. In such cases, the mower may prevent cutting the corresponding turf too short. In various examples, in addition to, or alternatively to, idling the blade a deck height may be increased. In at least some such examples, the deck height may be based at least in part on the difference calculated in 506, whether proportionally, linearly, non-linearly, to a fixed height, or the like.

At 512, mower alignment may be measured after idling the blades. At 514, the system may determine whether, based at least in part on the new measurement or determination of orientation, the mower has returned to a previous orientation or is otherwise within a threshold orientation of the surface. If the mower is aligned with the surface, or has returned to within a threshold of a previous orientation before idling the blades, the process may proceed to 516 where blade speed is increased to the nominal (or previous) blade speed and/or the deck height is returned to a previous (or desired/set) deck height. Otherwise, process may return to 504 to continuously determine whether the mower has returned to a desired orientation and/or if there are no additional changes in orientation to the surface on which the mower is mowing.

Example System

Figure 6:
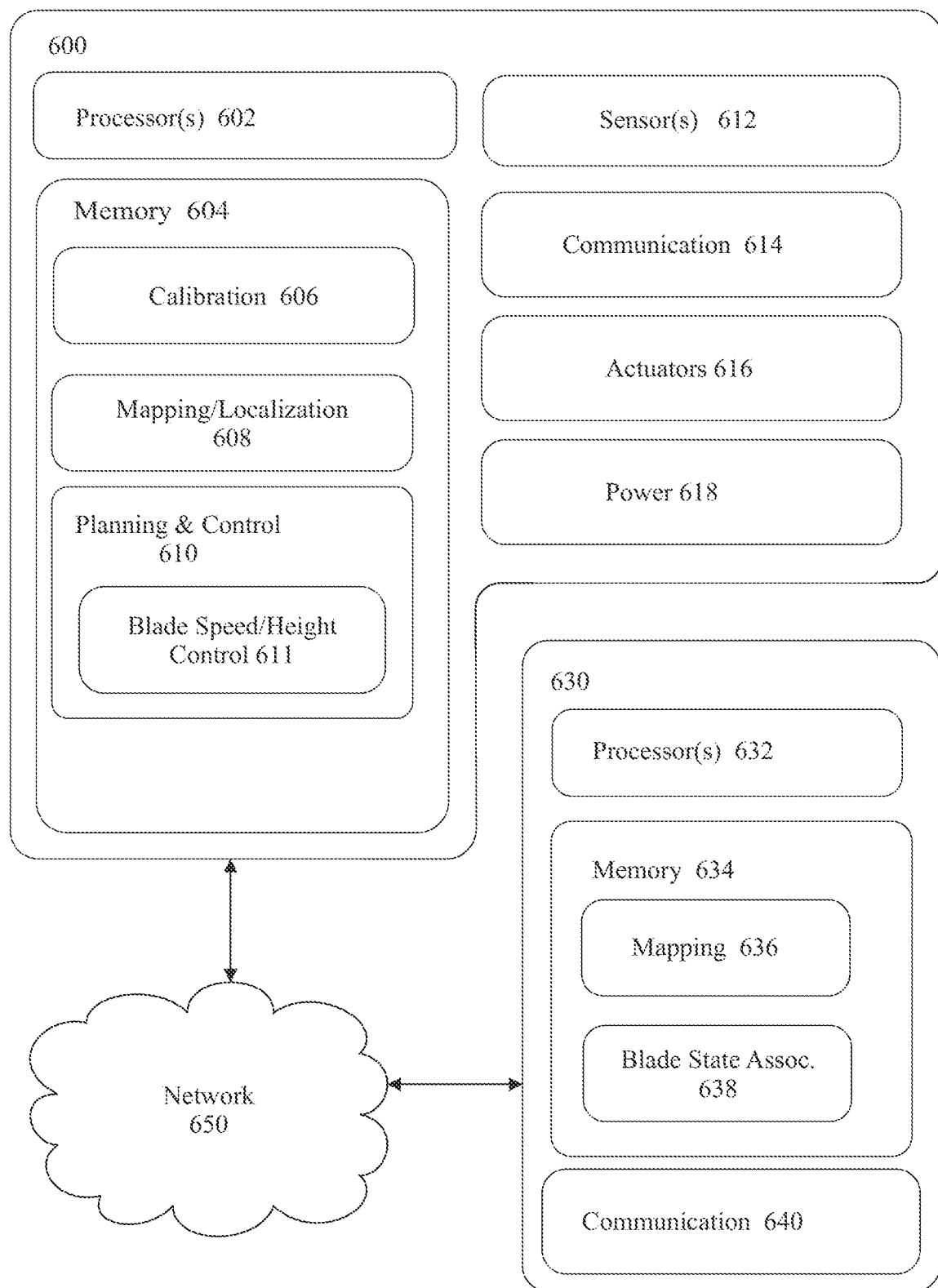
FIG. 6 shows an example system for performing any one or more of the techniques described in detail herein.

FIG. 6 is an example system 600 capable of performing the operations described herein. Such a system 600 may comprise one or more of processors 602, memory 604, sensor(s) 612, communication subsystem 614, actuators 616, and power system 618. Further, though depicted in FIG. 6 as a single system 600 for illustrative purposes, the intention is not to be so limiting. For example, the system 600 may be a distributed system (either locally or non-locally), where each block may be present on (or performed by) a remote system. Further, though particular blocks are associated with individual systems or subsystems, the disclosure is not meant to be so limiting. Indeed, any block may be present in any one or more of the systems or subsystems illustrated in FIG. 6 (or not present at all).

The system 600 may include one or more processors 602, any of which capable of performing the operations described herein. In some examples, the processor(s) 602 may be located remotely from the system 600. The one or more processor(s) 602 may comprise one or more central processing units (CPUs), one or more graphics processing units (GPUs), digital signal processors (DSPs), field programmable gate arrays (FPGAs), application specific integrated circuits (ASICs), or the like.

Memory 604 is an example of non-transitory computer readable media capable of storing instructions which, when executed by any of the one or more processor(s) 602, cause the one or more processor(s) 602 to perform any one or more of the operations described herein (e.g., those described in reference to any of FIG. 1-6). The memory 604 can store an operating system and one or more software applications, instructions, programs, and/or data to implement the methods described herein and the functions attributed to the various systems. In various implementations, the memory 604 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 604 is capable of storing raw sensor data from the one or more sensor(s) 612, compressed or downsampled sensor data, output (or intermediate representations) of one or more machine learning models (e.g., feature maps of neural networks), and/or representations of the raw sensor data.

Sensor(s) 612 may comprise one or more image sensor(s), radar(s), lidar(s), ultrasonic(s), touch sensors, Global Positioning and/or Navigation Satellite Systems, inertial measurement units (IMUs)—which may comprise one or more accelerometers, gyroscopes, and/or magnetometers, and the like, encoder(s) (which may be associated with any one or more wheels or one or more blades), Hall sensors, ammeters, voltmeters, power meters, etc. Image sensors may comprise, for example, RGB cameras, intensity cameras (e.g. greyscale or monochrome), stereo cameras, depth cameras (e.g. structured light sensors, time of flight (TOF) cameras, etc.), RGB-D cameras, infrared cameras, ultraviolet cameras, hyperspectral cameras, and the like. In those examples where multiple image sensors are contemplated, various image sensors may have varying fields of view. For example, where at least two image sensors are used, one image sensor may be a narrow field of view camera and the other a wide angle field of view camera.

Sensor(s) 612 may further include, for example, encoders (such as wheel encoders), ultrasonic transducers (e.g. SONAR), thermal imaging sensors (e.g. infrared imagers), non-contact temperature sensors (e.g. sensors capable of determining the temperature of a surface), ambient light sensors (e.g. light sensors such as, but not limited to, photodiodes capable of determining an intensity of light at 600-1200 nm), humidity sensors, pressure sensors, bolometers, pyrometers, wind speed sensors, and the like. Sensor data from such other sensors 612 may be used to generate the three-dimensional maps and/or localize the device 600. Any of the one or more sensor(s) 612 may also be associated with a timestamp including, but not limited to, a time of day, time of month, and/or time of year (e.g. Jan. 16, 2018 4:50 am UTC). In some examples, a user may specify whether to update an existing map and/or generate a new map.

Such an example system 600 as shown in FIG. 6 may additionally or alternatively comprise one or more communication subsystems 614. An example communication subsystem 614 may be used to send and receive data either over a wired or wireless communication protocol, as well as provide data connectivity between any one or more of the processors 602, memory 604, and sensors 612. Such protocols may include, but are not limited to, WiFi (802.11), Bluetooth, Zigbee, Universal Serial Bus (USB), Ethernet, TCP/IP, serial communication, cellular transmission (e.g., 4G, 5G, CDMA, etc.) and the like. As indicated herein, such a communication subsystem 614 may be used to send data (e.g., sensor data, control signals, etc.) to other systems (e.g. cloud based computers, etc). In at least some examples, to minimize an amount of data transferred (as raw sensor data may amount to upwards of multiple gigabytes to multiple terabytes per day), raw sensor data from the one or more sensors 612 may be downsampled or compressed before transmission. In at least one example, sensor data (whether raw, compressed, downsampled, a representation thereof, or otherwise) may be automatically uploaded to another computing device when in a particular location (e.g. when in a shed, or other preselected user location). Representations of data may include, for example, averages of the data, feature maps as output from one or more neural networks, extracted features of the data, bounding boxes, segmented data, and the like.

The system 600 may comprise actuator(s) 616, such as, but not limited to, one or more motors to provide torque to one or more wheels associated with the system 600, a linear actuator to raise and lower a blade platform (though any other actuator is contemplated), one or more motors to spin associated one or more blades for cutting, one or more brakes associated with the one or more wheels, and the like. Such actuators may further comprise, for example, electric and/or mechanical motors, hydraulics, pneumatics, and the like. Upon receiving a signal from one or more of the planning and control subsystem 610, at least a portion of the actuator(s) may actuate in order to effectuate a trajectory (steering, acceleration, etc.), release fertilizer, seed, herbicide, pesticide, insecticide, seed, etc., and the like.

System 600 may also comprise a power system 618 including, but not limited to batteries, super capacitors, or otherwise to provide power to the one or more processor(s) 602, actuators 616, sensor(s) 612, or any other component or subcomponent of the system 600 which requires power.

Within memory 604, a calibration component 606 may perform calibration of the one or more sensor(s) 612 and/or actuators 616. Calibration may comprise determining one or more sensor intrinsics and/or extrinsics, as well as determining positions of components or subcomponents (e.g., blade height), applied torques relative to currents applied, and the like. Such calibration protocols performed by calibration component 606 may ensure that any one or more components or subcomponents of system 600 is working properly and enable correct calculations to be generated given the system's 600 current understanding of the relative positions, orientations, and parameters of the other components and subcomponents. Calibration may also perform those calibration operations described in detail herein, such as with respect to FIG. 3.

A mapping and localization subsystem 608 may take in sensor data from any one or more of the sensor(s) 612, in addition to any one or more outputs from the calibration subsystem 606 to one or more of map an area and/or provide a position and/or orientation of the system 600 relative to the map. In at least one example, sensor data from the one or more sensor(s) 612 may be used to construct (and/or update) a two- and/or three-dimensional map of the scanned area. When updating, preexisting map data may be received from memory 604 and/or from server 630. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map may be stored as a signed distance function (SDF), or truncated SDF (TSDF), triangle mesh, mosaics, etc. Use of voxel hashing may improve memory requirements for both storage and raycasting. In at least some examples, sensor data may include radar data indicative of subterranean objects (e.g. pipes, golf balls, rocks, etc.). Such subterranean objects may provide features for use in creating the map. For example, locations of sprinklers, piping, rocks, moisture levels, and the like may be combined (or fused) with other sensor data to both generate the maps and localize against them.

Furthermore, various combinations of sensor data may be used to provide additional insight as derived sensor data. As a non-limiting example, sensor data from wide-angle, dual baseline, image sensors may be used to reconstruct depth of the environment and provide additional features for use in generating the map and or localizing the system 600 against such a map. Any such derived sensor data may be either used for mapping and/or localization, as well as may be associated with the map after it has been generated (e.g. storing the value associated with the portion of the map where the data was collected). Further, in at least some examples, control signals (as may be received and/or generated by system 600) may be associated with the map at mapping and localization component 608. In some examples, GNSS data may be used to inform a Region of Interest (ROI) of satellite imagery to download to, or otherwise augment, the two- or three-dimensional map. Additionally, or alternatively, such a system 600 may download, or otherwise access, weather data as additional sensor data. The weather data may be indicative of, for example, weather conditions for the time of day associated with the other sensor data.

Such maps may comprise signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (growth, absence of growth, presence of pests, presence of weeds or invasive species, etc.), thermal data, ambient light data, etc. may be associated with every location in the three-dimensional map. Additionally, or alternatively, image sensor data (e.g. color) may be associated with the map as well (e.g. by weighted averaging, or the like), so that a user viewing the map would quickly see a virtual representation of the scanned area, including color.

The planning and control subsystem 610 may determine commands for operating one or more of the actuator(s) 616. In some examples, such a planning and control subsystem 610 may determine one or more trajectories for the system 600 to follow (e.g., by determining a series of steering commands, acceleration commands, etc. which cause the system 600 to follow an intended pattern). Such trajectories may be determined in accordance with waypoints (e.g., GNSS-based waypoints) as may be received from a user via control interface (not shown) and/or calculated to optimize (e.g., minimize) a length of travel over a defined region of interest (e.g., as may be determined by server 630), a quality of cut, or a time to mow an area, for example. Such calculations may be determined, for example, using Bellman Ford's algorithm, Dijkstra's Algorithm, or otherwise.

As illustrated, the planning and control subsystem 610 comprises the blade speed/height control component 611. The blade speed/height control component 611 receives sensor data indicative of, or used to determine, any one or more of blade speed, blade height, forward motion of the system 600, current associated with a motor coupled to the blade, or a torque used to spin the blade and, based at least in part on such sensor data, map data, historical sensor data, or otherwise as described herein, performs a calibration of the blade speed and/or height and/or generates control signals for actuating one or more of the blade (via the associated blade controller) or the forward motion of the system 600 in accordance with those techniques set forth herein, especially with respect to any of FIGS. 3-5.

In any such example provided herein, such trajectories and/or controls may be calculated iteratively (and/or periodically) such that the system 600 (and/or associated user(s)) always has the most relevant information.

Server

Server 630 is an example of a remote device and may comprise one or more processor(s) 632, memory 634, and/or a communication component 640. The processor(s) 632 and memory 634 may be the same or similar to processor(s) 602 and memory 604. Similarly, communication component 640 may be similar to communication component 614. Though not illustrated for clarity, server 630 may communicate with either of the system 600 and/or control interface 620 via the communication component 640. Further, though depicted as a single entity, the server 630 may comprise a distributed system, whether locally or remote from one another.

Memory 634 may comprise a mapping component 636. Such a mapping component 636 may receive sensor data (and/or data derived therefrom) from the one or more sensor(s) 612 (e.g., via communication component 640) and use such sensor data to generate a map of an area. Mapping component 636 may be similar to, or the same as, mapping/localization component 608.

Memory 634 may further comprise a blade association component 638. Such a component may associate one or more parameters received from a system 600 with a map. As a non-limiting example, blade association component 638 may associate any one or more of blade speeds, blade heights, or mower speeds with a portion of the map data based at least in part on a location of the mower associated with where such measurements or determinations were performed. Such associations may then be made available for calibration, determination of repair/replacement of a blade (either by system 600 or server 630), or for comparison when operating system 600.

Though not illustrated for clarity, server 630 may further receive any other form of data (e.g., user authentication, obstacle detections, and the like) and further process the data and make it available to any other user. As several non-limiting examples, server 630 may compute statistics about a user operating the system 600 (such as amount of time mowed, an area mowed, and the like) and make that available to an end user (e.g., via a web interface). Similarly, additional data about obstacles received from the system 600 and/or a control interface (not shown) may be sent to an additional user to ensure that the obstacle is cleared for later autonomous mowing by the system 600.

Of course, though described above as two distinct systems (system 600 and server 630), any one or more of the components or subcomponents may be located in any one or more of the other systems or subsystems and any process or operation described herein may be performed on any one or more system or subsystem (including in in a distributed fashion).

Example Clauses

A. An autonomous lawn mower comprising: a deck; a first motor coupled to a blade of the autonomous lawn mower; a second motor coupled to a wheel of the autonomous lawn mower; one or more processors; and one or more non-transitory computer readable media having instructions stored thereon which, when executed by the one or more processors, cause the one or more processors to perform operations comprising: receiving a desired blade speed; determining a measured blade speed; determining a measured current; determining, based at least in part on the measured blade speed and the desired blade speed, a first indication of impact to mowing operations; determining, based at least in part on the measured current, a second indication of impact to mowing operations; determining, based at least in part on one or more of the first indication or the second indication, a control signal; and controlling one or more of the first motor or the second motor based at least in part on the control signal.

B. The autonomous lawn mower described in clause A, wherein determining the first indication comprises determining that a difference between the measured blade speed and a previously measured blade speed meets or exceeds a threshold difference blade speed, wherein the control signal comprises idling the first motor and idling the second mower, and wherein the operations further comprise: determining an angle associated with the blade; and determining, based at least in part on the angle, a region proximate the autonomous lawn mower having a likelihood of an obstacle.

C. The autonomous lawn mower described in either clause A or B, wherein determining the first indication comprises determining a difference between the measured blade speed and the desired blade speed meets or exceeds a threshold difference in blade speed, and wherein the control signal is configured to one or more of: increase an amount of current to the first motor, alter a type of discharge, adjust a baffle associated with deck, actuate a discharge flap, decrease a speed associated with the second motor, or raise a height of the deck.

D. The autonomous lawn mower described in any of clauses A-C, wherein determining the second indication comprises: fitting a curve to a sequence of previously measured currents comprising the measured current; and determining a likelihood of current saturation based at least in part on the curve and a threshold current.

E. The autonomous lawn mower described in any of clauses A-D, wherein the control signal is configured to one or more of: decrease a speed associated with the first motor, decrease a speed associated with the second motor, alter a type of discharge, adjust a baffle associated with the deck, actuate a discharge flap, or raise a height of the deck.

F. The autonomous lawn mower described in any of clauses A-E, wherein a difference between the measured blade speed and the desired blade speed is more than or equal to a threshold difference in blade speed, wherein the measured current meets or exceeds a threshold current, and wherein the control signal is configured to: idle the second motor; and rotate the first motor in a reverse direction.

G. A method for controlling a lawn mower comprising: one or more of determining or receiving a desired blade speed; determining a blade speed of the blade; determining a drive control characteristic associated with a motor coupled to the blade; determining, based at least in part on the blade speed and the desired blade speed, a first indication of impact to mowing operations; determining, based at least in part on the drive control characteristic, a second indication of impact to mowing operations; determining, based at least in part on one or more of the first indication or the second indication, a control signal; and controlling the lawn mower based at least in part on the control signal.

H. The method described in clause G, wherein determining the first indication comprises determining that a difference between the blade speed and the desired blade speed meets or exceeds a first threshold blade speed difference, and wherein the control signal is configured to cause the lawn mower to one or more of: idle the blade, or stop motion of the lawn mower.

I. The method described in any of clauses G or H, wherein determining the first indication comprises determining that the difference meets or exceeds a second threshold blade speed difference, the second threshold blade speed being less than the first threshold blade speed, and wherein the control signal is configured to cause the lawn mower to one or more of: reduce a speed, alter the drive control characteristic associated with a motor coupled to the blade, actuate a component associated with the deck, or raise a height of a deck of the lawn mower.

J. The method described in any of clauses G-I, wherein the drive control characteristic comprises a current, and wherein determining the second indication comprises: fitting a curve to a sequence of previously measured currents comprising the measured current; and determining a likelihood of current saturation based at least in part on the curve and a threshold current.

K. The method described in any of clauses G-J, wherein the control signal is configured to cause the lawn mower to raise a height of the blade from a first blade height to a second blade height, the method further comprising: determining a region traversed by the lawn mower at the second blade height; lowering the blade height from the second blade height to a third blade height, the third blade height being less than or equal to the second blade heights; and controlling the lawn mower to mow the region using the third blade height.

L. The method described in any of clauses G-K, wherein the blade speed is less than or equal to the desired blade speed, wherein the current meets or exceeds a threshold current, and the control signal is configured to cause the lawn mower to: stop motion, and reverse a direction of spin of the blade.

M. The method described in any of clauses G-L, wherein determining the control signal comprises performing an optimization over one or more of a time to mow an area or a cut quality metric, and wherein cut quality metric is based at least in part on a consistency of cut height, an amount of deviation from a desired blade speed, or a deviation from a previous current.

N. The method described in any of clauses G-M, wherein the drive control characteristic comprises a current, the method further comprising: determining, based at least in part on the current and a plurality of previously measured currents, a trend; generating a signal based at least in part on the trend; and transmitting the signal to a user device, the signal configured to cause the user device to display a notification to the user to inspect lawn mower, wherein a previous measured current of the previously measured currents is associated with a previous mow of an area.

O. The method described in any of clauses G-N, wherein the lawn mower is controlled in accordance with the control signal for a period of time, and wherein the method further comprises controlling the lawn mower in accordance with a second control signal after the period of time.

P. The method described in any of clauses G-O, further comprising: receiving map data; determining a location of the lawn mower; and determining, based at least in part on the map data and the location, the desired blade speed.

Q. One or more non-transitory computer readable media having instructions stored thereon which, when executed by one or more processors, cause the one or more processors to perform operations comprising: determining a first control signal configured to control a lawn mower in accordance with nominal operating parameters; determining a change in an operating parameter of a mower; determining, based at least in part on the change, a second control signal; transmitting the second control signal to the lawn mower, the second control signal configured to cause the lawn mower to mow in accordance with a second set of operating parameters.

R. The one or more non-transitory computer readable media described in clause Q, wherein the second control signal is configured to cause the lawn mower to one or more of: alter a blade speed, alter a speed of the lawn mower, alter a deck height, alter a discharge type, or actuate a component associated with the discharge opening.

S. The one or more non-transitory computer readable media described in either clause Q or R, wherein the nominal operating parameter comprises a desired blade speed, and wherein the change comprises a difference between a measured blade speed and the desired blade speed.

T. The one or more non-transitory computer readable media described in any of clauses Q-S, wherein the nominal operating parameter comprises a threshold current, and wherein the change is based at least in part on: a difference between a measured current and the threshold current, or a curve fitting of the measured current and one or more previously measured currents.

U. An autonomous lawn mower comprising: a deck; a sensor; one or more processors; and one or more non-transitory computer readable media having instructions stored thereon which, when executed by the one or more processors cause the one or more processors to perform operations comprising: determining, based at least in part on the sensor data, a first orientation of the autonomous lawn mower; receiving map data; determining, based at least in part on one or more of the sensor data or the map data, a second orientation of a surface on which the autonomous lawn mower is mowing; determining, based at least in part on one or more of the first orientation or the second orientation, a control signal; and controlling the autonomous lawn mower in accordance with the control signal.

V. The autonomous lawn mower of described in clause U, wherein determining the control signal comprises determining a difference between the first orientation and the second orientation.

W. The autonomous lawn mower described in any of clauses U or V, wherein the operations further comprise determining, based at least in part on one or more of the map data or the sensor data, a third orientation of a surface proximate the autonomous lawn mower in a direction of travel of the autonomous lawn mower, and wherein determining the control signal is based at least in part on a difference between the second orientation and the third orientation.

X. The autonomous lawn mower described in any of clauses U-W, wherein controlling the autonomous lawn mower in accordance with the control signal comprises causing the autonomous lawn mower to one or more of: idle a blade speed of a blade of the autonomous lawn more, or alter a deck height of a deck of the autonomous lawn mower.

Y. The autonomous lawn mower described in any of clauses U-X, wherein the control signal comprises causing the autonomous lawn mower to alter the deck height, and wherein an amount the deck height is altered is based at least in part on one or more of the first orientation or the second orientation.

Z. The autonomous lawn mower as described in any of clauses U-Y, wherein determining the control signal comprises determining a first difference between the first orientation and the second orientation, and wherein the operations further comprise: receiving one or more of additional sensor data or additional map data; determining, based at least in part on the one or more of additional sensor data or additional map data, a third orientation of the autonomous lawn mower; generating, based at least in part on the third orientation, an additional control signal; and controlling the autonomous lawn mower in accordance with the additional control signal.

AA. The autonomous lawn mower as described in any of clauses U-Z, wherein the sensor comprises one or more of: an inertial measurement unit, a gyroscope, a tilt sensor, a camera, a radar, or a lidar.

BB. A method comprising: receiving sensor data from a sensor associated with a lawn mower; determining, based at least in part on sensor data, an orientation of the lawn mower; determining, based at least in part on the sensor data, a second orientation of a surface on which the lawn mower is mowing; determining, based at least in part on one or more of the first orientation or the second orientation, a control signal; and controlling the lawn mower in accordance with the control signal.

CC. The method described in clause BB, wherein determining the control signal comprises determining a difference between the first orientation and the second orientation.

DD. The method described in either clauses BB or CC, further comprising: receiving map data; and determining, based at least in part on one or more of the map data or the sensor data, a third orientation of a surface proximate the lawn mower in a direction of travel of the lawn mower, wherein determining the control signal is based at least in part on a difference between the second orientation and the third orientation.

EE. The method described in any of clauses BB-DD, wherein controlling the lawn mower in accordance with the control signal comprises causing the lawn mower to one or more of: idle a blade speed of a blade of the lawn more, or alter a deck height of a deck of the lawn mower.

FF. The method described in any of clauses BB-EE, wherein the control signal comprises causing the lawn mower to alter the deck height, and wherein an amount the deck height is altered is based at least in part on one or more of the first orientation or the second orientation.

GG. The method described in any of clauses BB-FF, wherein determining the control signal comprises determining a first difference between the first orientation and the second orientation, and wherein the method further comprises: receiving one or more of additional sensor data or additional map data; determining, based at least in part on the one or more of additional sensor data or additional map data, a third orientation of the autonomous lawn mower; generating, based at least in part on the third orientation, an additional control signal; and controlling the autonomous lawn mower in accordance with the additional control signal.

HH. The method described in any of clauses BB-GG, wherein the sensor comprises one or more of: an inertial measurement unit, a gyroscope, a tilt sensor, a camera, a radar, or a lidar.

II. One or more non-transitory computer readable media having instructions stored thereon which, when executed by one or more processors, cause the one or more processors to perform operations comprising: receiving sensor data from a sensor associated with a lawn mower; determining, based at least in part on the sensor data, an orientation of the lawn mower relative to a surface on which the lawn mower is mowing; determining, based at least in part on one or more of the orientation, a control signal; and transmitting the control signal to the lawn mower, the control signal configured to controlling the lawn mower to one or more of alter a blade speed or alter a height of a deck associated with the lawn mower to which the blade is coupled.

JJ. The one or more non-transitory computer readable media described in clause II, wherein determining the control signal comprises determining that the relative orientation meets or exceeds a threshold orientation.

KK. The one or more non-transitory computer readable media described in either clause II or JJ, wherein the orientation is a first orientation, wherein the operations further comprise: receiving map data associated with a region through which the lawn mower is mowing; determining, based at least in part on one or more of the map data or the sensor data, a second orientation of a surface proximate the lawn mower in a direction of travel of the autonomous lawn mower relative to the surface, and wherein determining the control signal is based at least in part on the second orientation.

LL. The one or more non-transitory computer readable media described in any of clauses II-KK, wherein the sensor comprises one or more of: a gyroscope, an accelerometer, a camera, or a lidar sensor.

MM. The one or more non-transitory computer readable media described in any of clauses II-LL, wherein the control signal is configured to cause the lawn mower to alter the deck height, and wherein an amount the deck height is altered is based at least in part on the orientation.

NN. The one or more non-transitory computer readable media described in any of clauses II-NN, wherein the operations further comprise: receiving additional sensor data; determining, based at least in part on the additional sensor data or additional map data, a second orientation of the lawn mower relative to the surface; determining, based at least in part on the second orientation, an additional control signal; and transmitting the additional control signal to the lawn mower, the additional control signal configured to cause the lawn mower to one or more of alter the blade speed to a previous blade speed or alter the height of the deck to a previous height.

CONCLUSION

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g. A, AB, AB, ABC, ABB, etc.). When "and/or" is used, it should be understood that the elements may be joined in the alternative or conjunctive.

What is claimed is:

1. An autonomous lawn mower comprising:
a deck;
a sensor;
one or more processors; and
one or more non-transitory computer readable media having instructions stored thereon which, when executed by the one or more processors cause the one or more processors to perform operations comprising:
determining, based at least in part on the sensor data, a first orientation of the autonomous lawn mower;
receiving map data;
determining, based at least in part on one or more of the sensor data or the map data, a second orientation of a surface on which the autonomous lawn mower is mowing;
determining, based at least in part on one or more of the first orientation or the second orientation, a control signal; and
controlling the autonomous lawn mower in accordance with the control signal,
wherein controlling the autonomous lawn mower in accordance with the control signal comprises causing the autonomous lawn mower to one or more of:
idle a motor associated with driving a blade of the autonomous lawn mower while the autonomous lawn mower is running, or
alter a deck height of a deck of the autonomous lawn mower.

2. The autonomous lawn mower of claim 1, wherein determining the control signal comprises determining a difference between the first orientation and the second orientation.

3. The autonomous lawn mower of claim 1, wherein the operations further comprise determining, based at least in part on one or more of the map data or the sensor data, a third orientation of a surface proximate the autonomous lawn mower in a direction of travel of the autonomous lawn mower, and
wherein determining the control signal is based at least in part on a difference between the second orientation and the third orientation.

4. The autonomous lawn mower of claim 1, wherein the control signal comprises causing the autonomous lawn mower to alter the deck height, and
wherein an amount the deck height is altered is based at least in part on one or more of the first orientation or the second orientation.

5. The autonomous lawn mower of claim 1, wherein determining the control signal comprises determining a first difference between the first orientation and the second orientation, and
wherein the operations further comprise:
receiving one or more of additional sensor data or additional map data;
determining, based at least in part on the one or more of additional sensor data or additional map data, a third orientation of the autonomous lawn mower;
generating, based at least in part on the third orientation, an additional control signal; and
controlling the autonomous lawn mower in accordance with the additional control signal.

6. The autonomous lawn mower of claim 1, wherein the sensor comprises one or more of:
an inertial measurement unit,
a gyroscope,
a tilt sensor,
a camera,
a radar, or
a lidar.

7. A method comprising:
receiving sensor data from a sensor associated with a lawn mower;
determining, based at least in part on sensor data, an orientation of the lawn mower;
determining, based at least in part on the sensor data, a second orientation of a surface on which the lawn mower is mowing;
determining, based at least in part on one or more of the first orientation or the second orientation, a control signal; and
controlling the lawn mower in accordance with the control signal,
wherein controlling the lawn mower in accordance with the control signal comprises causing the lawn mower to one or more of:
idle a motor associated with driving a blade of the lawn mower while the lawn mower is running, or
alter a deck height of a deck of the lawn mower.

8. The method of claim 7, wherein determining the control signal comprises determining a difference between the first orientation and the second orientation.

9. The method of claim 7, further comprising:
receiving map data; and
determining, based at least in part on one or more of the map data or the sensor data, a third orientation of a surface proximate the lawn mower in a direction of travel of the lawn mower,
wherein determining the control signal is based at least in part on a difference between the second orientation and the third orientation.

10. The method of claim 7, wherein the control signal comprises causing the lawn mower to alter the deck height, and
wherein an amount the deck height is altered is based at least in part on one or more of the first orientation or the second orientation.

11. The method of claim 7, wherein determining the control signal comprises determining a first difference between the first orientation and the second orientation, and wherein the method further comprises:
receiving one or more of additional sensor data or additional map data;
determining, based at least in part on the one or more of additional sensor data or additional map data, a third orientation of the autonomous lawn mower;
generating, based at least in part on the third orientation, an additional control signal; and
controlling the autonomous lawn mower in accordance with the additional control signal.

12. The method of claim 7, wherein the sensor comprises one or more of:
an inertial measurement unit,
a gyroscope,
a tilt sensor,
a camera,
a radar, or
a lidar.

13. One or more non-transitory computer readable media having instructions stored thereon which, when executed by one or more processors, cause the one or more processors to perform operations comprising:
receiving sensor data from a sensor associated with a lawn mower;
determining, based at least in part on the sensor data, an orientation of the lawn mower relative to a surface on which the lawn mower is mowing;
determining, based at least in part on one or more of the orientation, a control signal; and
transmitting the control signal to the lawn mower, the control signal configured to control the lawn mower to one or more of idle a motor associated with driving a blade of the lawn mower while the lawn mower is running, or alter a deck height of a deck of the lawn mower.

14. The one or more non-transitory computer readable media of claim 13, wherein determining the control signal comprises determining that the relative orientation meets or exceeds a threshold orientation.

15. The one or more non-transitory computer readable media of claim 13, wherein the orientation is a first orientation,
wherein the operations further comprise:
receiving map data associated with a region through which the lawn mower is mowing;
determining, based at least in part on one or more of the map data or the sensor data, a second orientation of a surface proximate the lawn mower in a direction of travel of the autonomous lawn mower relative to the surface, and
wherein determining the control signal is based at least in part on the second orientation.

16. The one or more non-transitory computer readable media of claim 13, wherein the sensor comprises one or more of:
a gyroscope,
an accelerometer,
a camera, or
a lidar sensor.

17. The one or more non-transitory computer readable media of claim 13, wherein the control signal is configured to cause the lawn mower to alter the deck height, and
wherein an amount the deck height is altered is based at least in part on the orientation.

18. The one or more non-transitory computer readable media of claim 15, wherein the operations further comprise:
receiving additional sensor data and additional map data;
determining, based at least in part on the additional sensor data or additional map data, a second orientation of the lawn mower relative to the surface;

determining, based at least in part on the second orientation, an additional control signal; and transmitting the additional control signal to the lawn mower, the additional control signal configured to cause the lawn mower to one or more of alter the blade speed to a previous blade speed or alter the height of the deck to a previous height.

\* \* \* \* \*